US006795506B1

United States Patent
Zhang et al.

(10) Patent No.: US 6,795,506 B1
(45) Date of Patent: Sep. 21, 2004

(54) METHODS AND APPARATUS FOR EFFICIENT SCHEDULING AND MULTIPLEXING

(75) Inventors: Ji Zhang, San Jose, CA (US); Humphrey Liu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 09/684,623

(22) Filed: Oct. 5, 2000

Related U.S. Application Data

(60) Provisional application No. 60/157,820, filed on Oct. 5, 1999.

(51) Int. Cl.[7] ............................. H04N 7/12; H04L 12/28
(52) U.S. Cl. ............................. 375/240.26; 370/395.1; 348/390.1
(58) Field of Search ...................... 375/240.03, 240.01, 375/240.08, 240.02, 240.26; 370/395.1, 394, 468, 252; 348/700, 467, 423.1, 405.1, 385.1, 387.1, 390.1

(56) References Cited

U.S. PATENT DOCUMENTS

| | | | |
|---|---|---|---|
| 5,861,919 A | | 1/1999 | Perkins et al. |
| 5,862,140 A | * | 1/1999 | Shen et al. ................. 370/468 |
| 6,002,687 A | * | 12/1999 | Magee et al. ............... 370/394 |
| 6,192,083 B1 | | 2/2001 | Linzer et al. |
| 6,233,226 B1 | * | 5/2001 | Gringeri et al. ............ 370/252 |
| 6,240,103 B1 | * | 5/2001 | Schoenblum et al. ....... 370/468 |
| 6,310,915 B1 | * | 10/2001 | Wells et al. ........... 375/240.03 |
| 6,418,122 B1 | * | 7/2002 | Schoenblum et al. ....... 370/252 |
| 6,483,543 B1 | * | 11/2002 | Zhang et al. ............. 348/390.1 |
| 6,546,013 B1 | * | 4/2003 | Huang et al. ............ 370/395.1 |

OTHER PUBLICATIONS

International Organisation for Standardisation Organisation Internationale De Normalisation, "Generic Coding of Moving Pictures and Associated Audio: Systems", ISO/IEC JTC1/SC29/WG11/N0801, Nov. 13, 1994.

Huifang Sun, "Architectures for MPEG Compressed Bitstream Scaling", IEEE Transactions on Circuits and Systems for Video Technology, vol. 6, No. 2, Apr. 1996, pp. 191–199.

Wei Ding, "Joint Encoder and Channel Rate Control of VBR Video over ATM Networks", IEE Transactions on Circuits and Systems for Video Technology, vol. 7, No. 2, Apr. 1997, pp. 266–278.

* cited by examiner

*Primary Examiner*—Gims Philippe
(74) *Attorney, Agent, or Firm*—Beyer Weaver & Thomas, LLP

(57) ABSTRACT

Techniques and mechanisms are provided for scheduling and multiplexing compressed bitstreams. A compressed bitstream includes bit rate information describing the bit rate of video data. The bit rate information is used to improve the scheduling and multiplexing efficiency of compressed bitstreams. Compressed video data can be transmitted over communication channels at bit rates that comply with available channel bandwidth.

46 Claims, 11 Drawing Sheets

METHODS AND APPARATUS FOR EFFICIENT SCHEDULING AND MULTIPLEXING

CROSS-REFERENCE TO RELATED APPLICATION

This application claims priority under 35 U.S.C. §119(e) from co-pending U.S. Provisional Patent Application No. 60/157,820 filed Oct. 5, 1999, by Ji Zhang et al., and titled "Methods for Efficient Statistical Re-multiplexing Via In-Band Message Passing", which is incorporated by reference herein for all purposes. This application cross references co-pending U.S. Patent Application entitled "A System and Method for Transporting Compressed Video and Data Bitstream Over a Communication Channel" naming Ji Zhang et al. as inventors, filed on Oct. 10, 1997 (U.S. application Ser. No. 08/947,480), which is incorporated by reference herein.

BACKGROUND OF THE INVENTION

The present invention relates generally to systems and methods for transmitting data. More specifically, the present invention relates to systems and methods for efficiently scheduling and multiplexing multiple compressed bitstreams including video data using bit rate information describing the bit rate of the video data. In addition, the present invention relates to systems and methods for producing bit rate information describing the bit rate of video data and transmitting bitstreams including compressed video data and the bit rate information.

Video services are provided by a wide array of video content suppliers. For example, residential digital video services may include digital television, video on demand, Internet video, etc.—each service having hundreds of programs. A program refers to one or more bitstreams that are used to represent the video content and associated audio content. A target receiver for the programs, such as a set-top box (STB) located in a residential home, receives video programs from a number of different video content suppliers via assorted transmission channels. Typically, the 'last mile' of transmission between the video content suppliers and the target receiver is along the same transmission channel, requiring the channel to carry multiple video programs from the wide array of suppliers—and often simultaneously.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. In fact, many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent compressed video, audio and/or data. A bit rate is the number of bits per second that is required to transport the bitstream. A bit error rate is the statistical ratio between the number of bits in error due to transmission and the total number of bits transmitted. A channel capacity is the maximum bit rate at which a given channel can convey digital information with a bit error rate no more than a given value.

Since transmission of video data with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. For example, a digitized video data having an uncompressed bit rate of roughly 120 million bits per second (Mbps) can be represented by a compressed bitstream having a bit rate of 4–6 Mbps. Compression represents in significant data savings which results in much more efficient use of channel bandwidth and storage media.

When the digital video is first compressed, the encoder assumes a particular bit rate profile, whether it is constant bit rate (CBR) or a variable bit rate (VBR). The word "profile" refers to the fact that transport bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively.

The VBR representation of compressed video data allows a video encoder to generate compressed bitstreams that, when decoded, produce consistent video quality. However, as a result of the compression process, the number of bits required to represent the compressed data differs widely from picture to picture. The specific VBR characteristics of the compressed bitstream depends on the complexity of the video image, amount of motion in the video sequence, as well as changes made in post-generation such as scene cuts, fades, wipes, picture-in-picture, etc. As channel capacities are often expressed as constant bit rates, the variable nature of VBR compressed bitstream often poses a problem for video transmission.

One potential consequence of exceeding channel capacity for a VBR compressed bitstream on a particular channel is compromised video quality. Commonly, if one or more bitstreams is too large to fit within a channel, video data may be dropped from the bitstream or simplified to allow transmission; thus sacrificing end user video quality. Due to the real-time nature of compressed video transmission, dropped packets are not re-transmitted. Also, it is important to point out that compressed bitstreams are usually generated by either real-time encoders or pre-compressed video server storage systems. Both are likely to be in a remote site, away from the network itself. This increases the difficulty in encoding the video signal with a resulting bit rate profile sensitive to the connection bandwidth available for a particular channel or target receiver.

To further reduce the excessive amount of video transmission, bitstreams are frequently combined for transmission within a channel to make digital video data more transportable. A multiplex is a scheme used to combine bitstream representations of multiple signals, such as audio, video, or data, into a single bitstream representation. A re-multiplex is a scheme used to combine multiple bitstream representations of multiplexed signals into a single bitstream representation.

One important benefit of the VBR compression is achieved through the so-called 'statistical multiplexing'. Statistical multiplexing is an encoding and multiplexing process which takes advantage of the VBR nature of multiple compressed video signals. When a statistical multiplexer combines multiple bitstreams, an algorithm may be used to adapt the bit rate of each VBR video signal but the total bit rate of the output multiplex is kept at a constant value. Statistical multiplexing encompasses multiplexing architecture having a reverse message path from the multiplexer to the encoders. This is also often referred to closed-loop statistical multiplexing.

FIG. 1A illustrates a high level architecture for a conventional closed-loop statistical multiplexer (statmux) 10. The closed-loop statmux 10 has a closed-loop signal path 11 between a statmux rate controller 12 and program encoders 14 and 16. The signal path 11 provides the rate controller 12 with a global view of the bit rate requirements for each of the program encoders 14 and 16 and allows communication between the rate controller 12 and each encoder. The encoders 14 and 16 provide compressed video, audio and data bitstreams to a multiplexer 15, which schedules the compressed bitstreams to output a multiplexed compressed bitstream 18. Each of the encoders 14 and 16 does not have knowledge of the bandwidth requirements of data being encoded by the other encoder and hence relies on messages sent by the rate controller 12. Based on these messages received from the statmux rate controller 12, the program encoders 14 and 16 adjust their encoding bit rate. Since the closed-loop statmux 10 relies on prompt delivery of the messages between the statmux rate controller 12 and the encoders 14 and 16, the closed-loop statmux 10 usually requires co-location of all program encoders 14 and 16, the rate controller 12 and multiplexer 15.

Statistical re-multiplexing, also called open-loop statistical multiplexing, or statistical rate re-multiplexing, is a process which performs statistical multiplexing of signals already in compressed format. Thus, statistical re-multiplexing includes accepting multiple VBR bitstreams and outputting a single CBR bitstream that fits within an available channel. In applications such as video on demand, digital cable headend systems, and digital advertisement insertion systems, statistical re-multiplexing may improve the overall system efficiency, resulting in better bandwidth usage and reduced transmission cost.

A conventional open-loop statistical re-multiplexer (stat remux) architecture 20 is illustrated in FIG. 1B. The architecture 20 includes an open-loop statistical re-multiplexer 21 that accepts compressed digital bitstreams consisting of multiple video/audio/data programs from encoders 22 and 24. The benefit of the open-loop stat remux architecture 20 is that it does not require reverse signal paths to the program encoders 22 and 24.

Functionally, the statistical re-multiplexer 21 does not control the bit rate output of each of program encoders 22 and 24. Although closed-loop statistical re-multiplexing can be highly efficient in bandwidth sharing among multiple encoded video/audio programs, it is not well suited for bandwidth sharing of multiple program encoders distributed over a large geographic area, or when multiple program streams are encoded and stored at different times. Even if such a reverse signal path exists, it must have low delay, and the program encoders 22 and 24 must be able to receive and correctly interpret the messages. Correct interpretation of the messages is often prevented when program encoders 22 and 24 in different geographic locations are not produced by the same manufacturer and implement different signal interfaces. Thus, network devices transmitting multiple video bitstreams typically use the open-loop stat remux architecture 20.

Unfortunately, the open-loop stat remux architecture 20 relies on information solely contained in the pre-compressed bitstreams for re-encoding. This reliance poses some limitations. One limitation is that the stat remux 21 cannot obtain information on the video signals within each compressed bitstreams it receives without completely decoding the signal back to the spatial domain (baseband). When the stat remux 21 is configured within a network device such as a router or headend, this complete decoding increases complexity of the network device, slows transmission of the video data, and decreases transmission efficiency. Any of these may diminish end-user video quality.

Based on the foregoing, improved methods and systems for transmitting video data over transmission channels would be desirable.

SUMMARY OF THE INVENTION

The present invention overcomes the deficiencies and limitations of the prior art with systems and methods for scheduling and multiplexing compressed bitstreams including video data with assistance from bit rate information describing the bit rate of video data included in one or more of the bitstreams. Two examples of bit rate information include coding statistics and raw video data statistics. The bit rate information is typically generated before multiplexing. Knowing compression related bit rate information ahead of time can be used to improve the scheduling and multiplexing efficiency of compressed bitstreams including video data and thus improve transmission efficiency of compressed video data over communication channels at bit rates that comply with the available bandwidth of the channels. For example, knowledge of bit rate information allows a scheduler to 'steal' bandwidth from one compressed bitstream and use it to improve the picture quality of another bitstream within the same multiplex. In addition, using the bit rate information associated with many coded pictures, before the coded picture data enters the scheduler, allows the scheduler to adopt a 'look-ahead' policy that makes scheduling and transcoding decisions based not only on the data to be immediately transmitted, but also on data to be transmitted ahead in time. Video data transmission in this manner may be used to improve video service quality for an end-user and to improve bandwidth usage efficiency while maintaining the video quality.

In one aspect, the present invention relates to a network device for providing a compressed bitstream including video data. The network device comprises an encoder apparatus that receives video data and outputs the compressed bitstream including the video data. The network device also comprises a processor apparatus that outputs bit rate information describing the bit rate of the video data. The network device further comprises a network interface that transmits an output compressed bitstream comprising the compressed bitstream including the video data and transmits the bit rate information.

In another aspect, the present invention relates to a method for providing compressed video data. The method comprises encoding video data to provide a compressed bitstream including the compressed video data. The method also comprises obtaining bit rate information describing the bit rate of the video data. The method further comprises transmitting an output compressed bitstream comprising the video data and transmitting the bit rate information.

In yet another aspect, the present invention relates to a network device for transmitting a first compressed bitstream including first video data and a second compressed bitstream including second video data onto a network. The network device comprises an extractor apparatus that obtains bit rate information describing the bit rate of the first video data. The network device also comprises a scheduler coupled to the extractor apparatus, the scheduler configured to receive the first compressed bitstream and receive the second compressed bitstream, the scheduler configured to use the bit rate information describing the bit rate of the first video data to schedule the first compressed bitstream and the second compressed bitstream, the scheduler also configured to output a compressed bitstream including the first video data and the second video data.

In still another aspect, the present invention relates to a network device for transmitting a first compressed bitstream including first video data and a second compressed bitstream including second video data onto a network. The network device comprises a processor apparatus that parses the first compressed bitstream and obtains bit rate information describing the bit rate of the first video data. The network device also comprises a scheduler coupled to the extractor apparatus, the scheduler configured to receive the first compressed bitstream and receive the second compressed bitstream, the scheduler configured to use the bit rate information describing the bit rate of the first video data to schedule the first compressed bitstream and the second compressed bitstream, the scheduler configured to output a compressed bitstream including the first video data and the second video data.

In another aspect, the present invention relates to a method for transmitting first video data and second video data over a transmission channel. The method comprises receiving a first compressed bitstream including the first video data and a second compressed bitstream including the second video data. The method also comprises obtaining bit rate information from the first compressed bitstream, the bit rate information describing the bit rate of the first video data. The method further comprises scheduling the first compressed bitstream including the first video data and the second compressed bitstream including the second video data using the bit rate information to provide a compressed bitstream comprising the first video data and the second video data. The method additionally comprises transmitting the compressed bitstream comprising the first video data and the second video data over the transmission channel.

In yet another aspect, the present invention relates to a system for providing compressed video data over a transmission channel. The system comprises means for receiving a first compressed bitstream including first video data and a second compressed bitstream including second video data. The system also comprises means for obtaining bit rate information from the first compressed bitstream, the bit rate information describing the bit rate of the first video data. The system further comprises means for scheduling the first compressed bitstream including the first video data and the second compressed bitstream including the second video data using the bit rate information to provide a compressed bitstream comprising the first video data and the second video data. The system additionally comprises means for transmitting the compressed bitstream comprising the first video data and the second video data over the transmission channel.

In still another aspect, the present invention relates to a computer readable medium including instructions for providing compressed video data over a transmission channel. The instructions comprises instructions for receiving a first compressed bitstream including first video data and a second compressed bitstream including second video data. The instructions also comprises instructions for obtaining bit rate information from the first compressed bitstream, the bit rate information describing the bit rate of the first video data. The instructions further comprises instructions for scheduling the first compressed bitstream including the first video data and the second compressed bitstream including the second video data using the bit rate information to provide a compressed bitstream comprising the first video data and the second video data. The instructions additionally comprises instructions for transmitting the compressed bitstream comprising the first video data and the second video data over the transmission channel.

These and other features and advantages of the present invention will be described in the following description of the invention and associated Figures.

DETAILED DESCRIPTION OF THE PREFERRED EMBODIMENTS

Figure 1A:
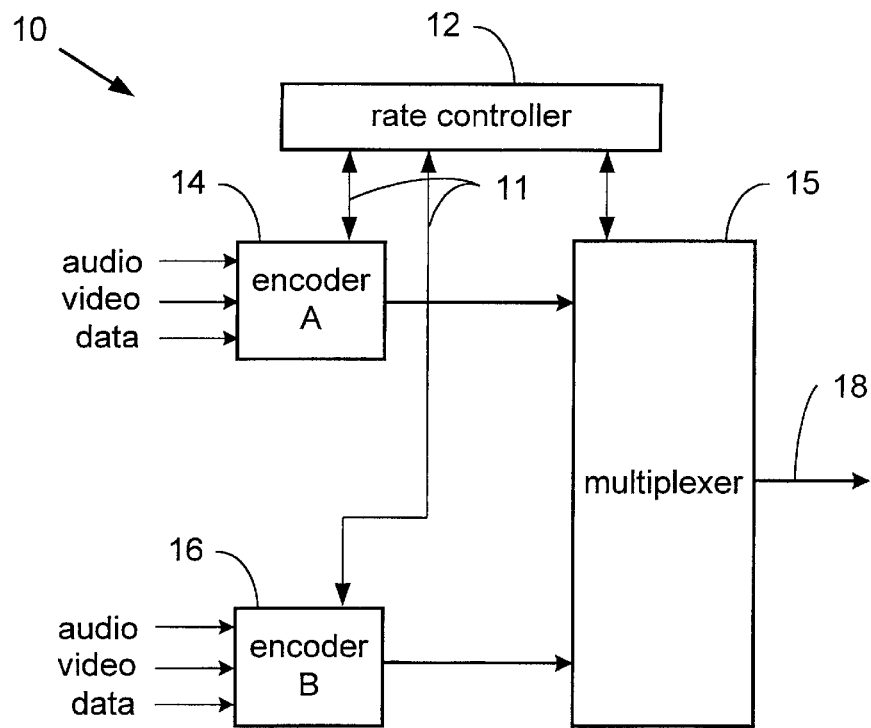
FIG. 1A illustrates a high level architecture for a conventional closed-loop statistical multiplexer.
Figure 1B:
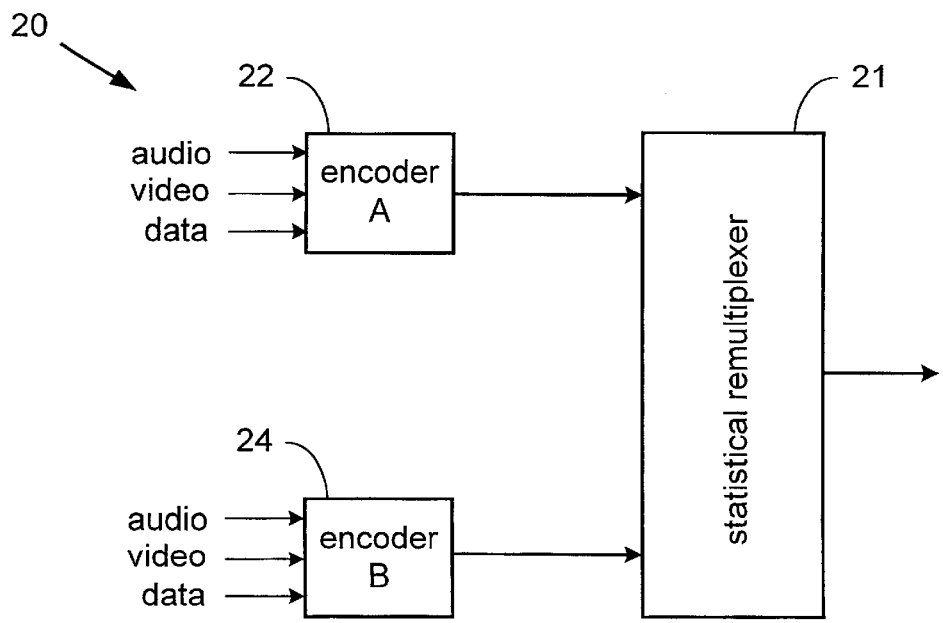
FIG. 1B illustrates a high level architecture for a conventional open-loop statistical re-multiplexer architecture.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In some multimedia delivery systems, compressed video programs are provided by numerous video content suppliers and delivered to numerous digital receiver/decoders via one or more digital transmission channels. In such multi-cast situations, a compressed bitstream may be combined with other compressed bitstreams within a multiplexed bitstream. At some point in during transmission, each compressed bitstream in the multiplex may be separated from the original multiplex and delivered, along with other separated compressed bitstreams, to a target receiver/decoder. The target decoder typically may specify a set of compressed bitstreams it desires to receive. In this case, an upstream network device is then responsible for receiving each desired compressed bitstream, removing it from a multiplex if received as such, scheduling and re-multiplexing the compressed bitstream with one or more additional compressed bitstreams, and providing a re-multiplexed output that fits within the available channel bandwidth between the network device and the target receiver/decoder. The re-multiplexing is preferably performed without sacrificing end user video quality and without requiring decompression of the input compressed bitstreams.

The present invention improves transmission of compressed video data. In one aspect, the present invention applies an open-loop re-multiplexer architecture that improves transmission of compressed video data by using bit rate information to facilitate scheduling and re-multiplexing of the compressed bitstream with other compressed bitstreams. In a specific embodiment, the bit rate information describes the coding parameters used at same or different coding conditions such as different spatial resolutions of the video data to be transmitted. In another embodiment, the bit rate information is generated and stored within an associated compressed bitstream before original transmission. As each of the input compressed bitstreams may have a dynamically varying variable bit rate (VBR), advance and accurate bit rate information generated before original transmission may greatly assist a downstream scheduler in providing the optimal transcoding and bit rate allocation strategies for the input compressed signals. Scheduling in this manner may reduce the total bit rate of the combined compressed bitstreams and allow bandwidth to be dynamically swapped between compressed bitstreams—thus improving video quality for the end-user.

In one aspect, the invention relates to a set of network devices. In one embodiment, each of the network devices is adapted to output bit rate information describing different coding conditions of video data it transmits. Each network device includes encoders that compress video data provided to them. At any time before, during or after compression, the network device may produce the bit rate information. In one embodiment, the bit rate information includes compression information describing the compression complexity of the video data as obtained during or after compression. This information may be based on a specific encoding and compression syntax and may include parameters such as the number of bits used per picture, for example. In another embodiment, the bit rate information includes measures of the complexity of the raw video data as obtained before compression. This pre-compression information may include image spatial complexity, temporal complexity, scene change, fade, wipe, special effects, etc. The bit rate information may assist downstream encoding processes in determining better bit usage allocations for video data.

In another aspect, the invention relates to network devices that multiplex compressed bitstreams. Each of the network devices is adapted to obtain bit rate information for a compressed bitstream that is to be multiplexed. In one embodiment, an input compressed bitstream includes bit rate information and the network device extracts the information from a known location in the input bitstream. The network device is also responsible for scheduling the compressed bitstream with one or more other compressed bitstreams using the bit rate information. In one embodiment, the network device performs open-loop re-multiplexing without decompression of the input compressed bitstreams while having closed-loop multiplexing benefits such as scheduling control of the compressed bitstreams to be combined. In addition to improved scheduling in this manner, the network device may also implement bit rate conversion on one or more of the input compressed bitstreams to facilitate transmission of the multiplexed bitstream onto a limited capacity channel.

Figure 2:
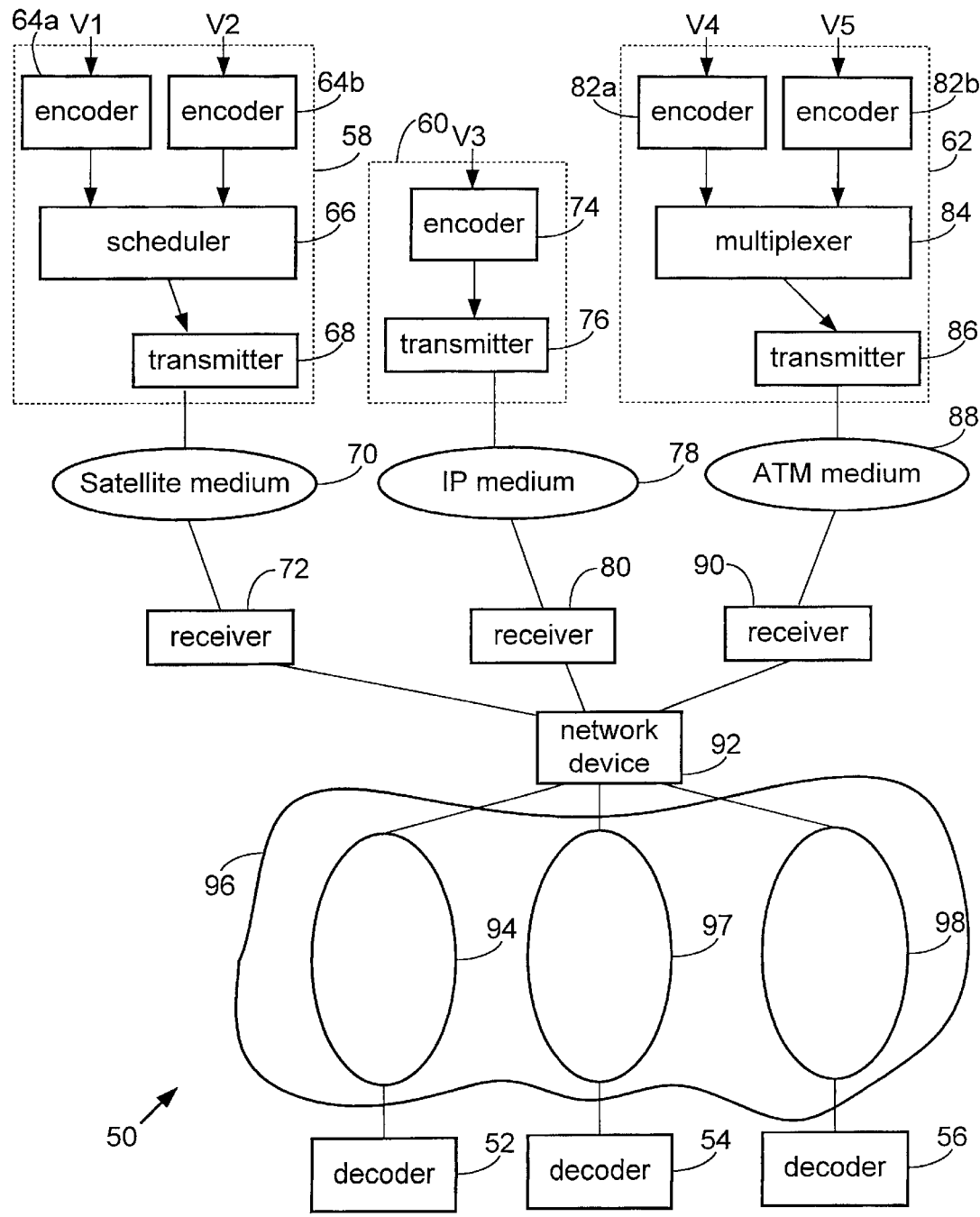
FIG. 2 is a high level block diagram of a system where bit rate information generation and bit rate information assisted scheduling and multiplexing is particularly advantageous will be described in accordance with one embodiment of the present invention.

Referring now to FIG. 2, a system where bit rate information generation and bit rate information assisted scheduling is particularly advantageous will be described in accordance with one embodiment of the present invention. The system 50 is responsible for transmitting compressed bitstreams including video data to target decoders 52, 54 and 56. The compressed bitstreams are produced by network devices 58, 60 and 62 which receive video data and encode the data into one or more compressed bitstreams.

More specifically, the network device 58 receives two uncompressed bitstreams comprising video programs V1 and V2, respectively. Encoders 64a and 64b compress the video data in each to provide two compressed bitstreams to a scheduler 66. During encoding of each bitstream, the network device 58 also produces coding statistics information describing coding parameters of the video data for V1 and V2, at same or different coding conditions, and embeds the information in the compressed bitstream. The scheduler 66 combines the two compressed bitstreams, including the coding statistics information, and produces a multiplexed compressed bitstream. The multiplexed compressed bitstream is provided to a transmitter 68 for output over a medium 70. The transmitter 68 can be any one of a variety of those known in the art for DSL networks, for example. In a specific embodiment, the medium is a satellite based communication system where the transmitter 68 transmits to a satellite which bounces the signal containing multiplexed compressed bitstream back to a satellite receiver which act as receiver 72.

The network device 60 receives an uncompressed bitstream comprising video program V3 and compresses the video data therein using an encoder 74 to provide a compressed bitstream including the video data. Before encoding of the uncompressed bitstream, the network device 62 also produces pre-compression coding information describing the uncompressed complexity of the video data for V3. The compressed bitstream and pre-compression coding information are then received by transmitter 76 and output over a medium 78. The transmitter 76 can be any one of a variety of those known in the art for IP networks, for example. In a specific embodiment, the medium 78 is an Internet network where the transmitter 76 transmits through a series of nodes, which route the compressed bitstream to a receiver 80.

The network device 62 receives two uncompressed bitstreams comprising video programs V4 and V5 respectively and compresses the video data in each, using encoders 82a and 82b respectively, to provide two compressed bitstreams to a multiplexer 84. The multiplexer 84 combines the two compressed bitstreams to produce a multiplexed compressed bitstream and provides the multiplexed compressed bitstream to a transmitter 86 for output over a medium 88. In this case, the network device 62 does not produce any bit rate information for the compressed bitstreams that it encodes. The transmitter 86 can be any one of a variety of those known in the art for ATM networks, for example. In a specific embodiment, the medium 88 is an Internet network where the transmitter 86 transmits through a series of ATM based routers which route the MPEG-2 compressed video data to a receiver 90.

The compressed bitstreams transmitted over the mediums 70, 78 and 88 are received by their respective receivers 72, 80 and 90, each of which is coupled to a network device 92. Based on a request one or more of the target decoders 52, 54 and 56, the network device 92 transmits any one or a multiplex of the compressed bitstreams including the video data for V1, V2, V3, V4 and/or V5.

The target decoder 52 receives compressed video data from the network device 92 through a local network 94. The local network 94 is included in a larger network 96 that also includes local networks 97 and 98, which service the target decoders 54 and 56, respectively. In one embodiment, the network device 58 is included in a central office, the network device 92 is a headend and the local network 94 corresponds to a geographic service area of a cable network serviced by the headed. The decoder 52 may then correspond to a decoder included in a set-top box or personal computer located in a residential home. The decoder 52 decompresses the compressed video data into an uncompressed format for visual output to the user.

In some cases such as within a telco environment, the network device 92 is aware of the video content requests of a target decoder that it transmits to and the available bandwidth therebetween. Alternatively, e.g. in some cable environments, the network device 92 broadcasts multiple multiplexed video programs without a specific requests from end user receivers. In some cable distribution networks for example, all compressed signals and programs are transmitted via the network device 92 to the local networks 94, 97 and 98, and then to the decoders. The network device 92 and local networks 94, 97 and 98 together form a distribution network for the compressed signals. In one exemplary cable distribution network, network device 92 is a so-called "super head-end" facility that feeds multiple multiplexed video programs to smaller regional head-ends within local networks 94, 97 and 98 via fiber optical networks (such as SONET or DWDM based networks). Each regional head-end in turn is connected to its own population of target decoders, i.e., multiple decoders like 52 are usually connected to a single regional head-end. In a typical telco scenario for example, the regional head-ends are telco central offices each connecting to a large number decoder/receivers via twisted phone wires (DSL).

In other cable distribution environments, the network device 92 selects video programs not based on individual end receiver request, but on a specific programming mix that the local cable operator plans to carry over their local cable distribution. By way of example, a local cable operator in San Jose, Calif. may carry services such as Discovery, CNN, HBO and ABC, and thus it receives and selects such programs via the network device and broadcasts them over their local cable distribution plant. Alternatively, a local operator in San Fransisco may carry services such as CNN, CBS and ABC, and will provide programs accordingly. In this case, end-receivers do not participate in the selection process. In contrast, in the case of video on demand, end receivers have control on the selection of programming, which typically originates from a video server and connected by the network device via local or wide area networks.

The system 50 of FIG. 2 is suitable for flexible video content transmission to the decoders 52, 54 and 56. The network device 92 selectively transmits one or more compressed bitstreams including the programs V1, V2, V3, V4 and/or V5. For each multiple compressed bitstream request, the network device 92 may multiplex compressed bitstreams including to the multiple programs. If only one program included in a multiplex is requested by a target decoder, e.g., V1 of the V1 and V2 multiplex, the network device 92 separates the appropriate compressed bitstream from its multiplex. In some cases, the network device 92 may also convert the bit rate of one or more compressed bitstreams to help the multiplexed bitstream fit within the allowable bandwidth between the network device 92 and one of the target decoders 52, 54 and 56.

For example, the decoder 52 requests the video programs V1 and V3 provided by encoders 58 and 60, respectively. The network device 92 receives the compressed bitstreams provided by the transmitters 68 and 76, separates program V1 from the compressed multiplex including programs V1 and V2, and re-multiplexes the compressed bitstreams including programs V1 and V3 to provide a multiplexed compressed bitstream including programs V1 and V3. The network device 92 also obtains the bit rate information as produced by the network device 58 and network device 60 for each of these compressed bitstreams uses the information to facilitate re-multiplexing. The network device 92 then transmits the multiplexed compressed bitstream including the programs V1 and V3 to the decoder 52.

The decoder 54 requests the video programs V1 and V5 provided by encoders 58 and 62, respectively. The network device 92 receives the multiplexed compressed bitstreams provided by the transmitters 68 and 86, separates the compressed bitstream including program V1 from the multiplexed compressed bitstream including programs V1 and V2, separates the compressed bitstream including program V5 from the multiplexed compressed bitstream including programs V4 and V5, and re-multiplexes the compressed bitstreams including programs V1 and V5 to provide a multiplexed compressed bitstream including programs V1 and V5. The network device 92 also obtains the bit rate information as produced by the network device 58 that was embedded in the compressed bitstream including program V1 and uses the information to facilitate re-multiplexing of both compressed bitstreams. The network device finally 92 transmits the multiplexed compressed bitstream including the programs V1 and V5 to the decoder 54.

The decoder 56 requests the video programs V2, V3 and V4 provided by encoders 58, 60 and 62, respectively. The network device 92 receives the multiplexed compressed bitstreams provided by the transmitters 68, 76 and 86, separates program V2 from the multiplexed compressed bitstream including programs V1 and V2, separates the compressed bitstream including program V4 from the multiplexed compressed bitstream including programs V4 and V5, and re-multiplexes the three compressed bitstreams including programs V2, V3 and V4 to provide a multiplexed compressed bitstream including programs V2, V3 and V4. The network device 92 also obtains the bit rate information as produced by the network device 58 and network device 60 for the compressed bitstreams including programs V2 and V4 and uses the information to facilitate re-multiplexing of all three compressed bitstreams. The bit rate information is also used to reduce the bit rate of the compressed bitstreams for V2 and V3 such that the multiplexed compressed bitstream may fit within the allowable bandwidth between the network device 92 and the decoder 56. The network device 92 then transmits the multiplexed compressed bitstream including the programs V2, V3 and V4 to the decoder 56.

While the present invention will now be described in the context of cable networks, Digital Subscriber Line networks (DSL), IP networks and ATM networks, those skilled in the art will realize that the present invention is applicable to a variety of other types of communication channels such as any xDSL includes ADSL, HDSL, VDSL, SDSL, or terrestrial broadcast network.

Asymmetric Digital Subscriber Loop, or ADSL, is a physical line code modulation scheme for transmitting a digital bitstream over a single pair of plain old telephone system (POTS) grade twisted copper wires, that are usually noisy and are subject to outside interference. Several schemes have been developed to achieve high channel capacity of the twisted copper wires. xDSL systems provide simple or full duplex raw bit pipes between the Central Office (CO) and the remote site receivers. The material content and the format of the bitstream or the protocols used by the connections being established by the bit pipe is immaterial to the xDSL system itself. In ADSL, the downstream link, from central office (CO) to remote site, has higher bandwidth than the upstream direction.

Because broadcast video quality can be achieved with compressed video, such as MPEG-2, at 3–6 Mbps, ADSL provides a useful delivery scheme for compressed digital video and other high speed data connecting COs with remote sites, which can be either consumer subscribers or business establishments. However, because of the variation in physical line conditions due to both the physical distance of the connection and the noise conditions of the lines, the ADSL transmission schemes do not specify channel capacity in either direction, rather the channel capacity is determined at connection set up time via channel initialization and training by the transceivers at the CO location and at the remote locations, in a conventional manner. The initialization and training process determines the proper coding configuration best matched to the current channel condition in order to achieve the maximum channel capacity. During the connection, due to change in line condition or due to loss of data, the transceivers may also re-initialize and retrain to settle on the new coding configuration.

In all the figures and discussions for the present invention, it is important to note that the channels are bi-directional, even though the present invention is described and shown by focusing on a single direction for ease of understanding. The present invention focuses on the transmission in a direction from a central office to a customer as shown in FIG. 2 from the network device 58 to the decoder 52. In other words, the transmitter device (such as transmitter 68) is also a receiver device in the reverse direction, from the customer to the central office (from decoder 52 to network device 58 of FIG. 2, for example).

The present invention improves multiplexing and transmission of compressed video data and allows flexible transmission even when the input compressed bitstreams to be re-multiplexed together may not fit within the allowable bandwidth of a channel they are to be transmitted on. Multiplexing according to the present invention includes obtaining bit rate information describing the of the video data for at least one of the input compressed bitstreams to be transmitted and scheduling using the bit rate information. In one embodiment, the bit rate information comprises coding statistics at same or different coding conditions of the video data for at least one of the input compressed bitstreams. In another embodiment, the bit rate information comprises video pre-compression coding information for at least one of the input uncompressed bitstreams.

The present invention also relates to network devices that generate bit rate information. The network devices may include an encoder apparatus comprising one or more video/audio/data encoder portions capable of compressing an input uncompressed bitstream and outputting a compressed bitstream. The network devices also include a processor apparatus that outputs bit rate information describing the bit rate of the video, audio and/or data information transmitted by the network devices.

Figure 3A:
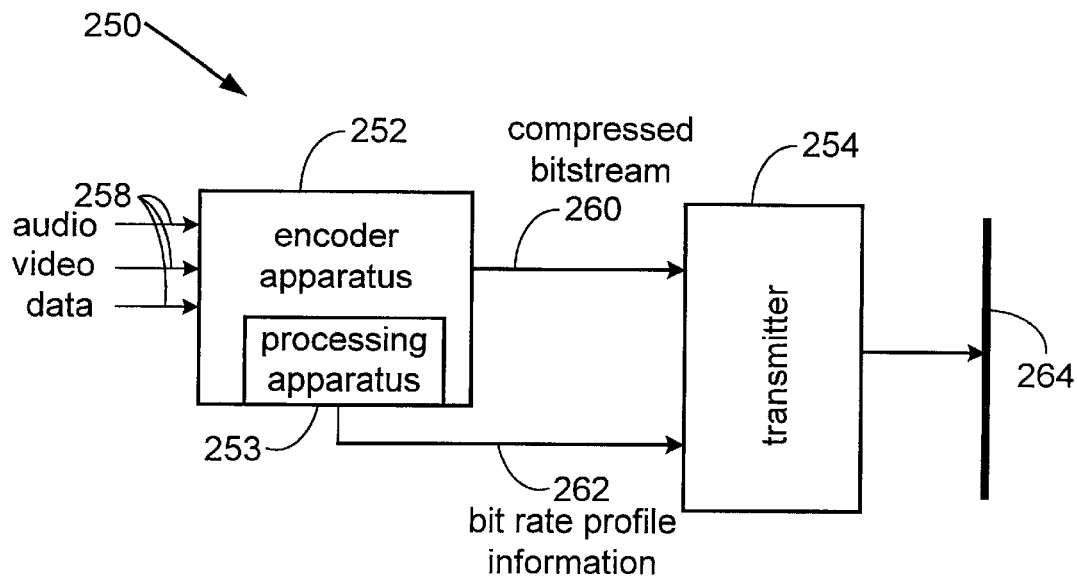
FIG. 3A is a high level block diagram of a system for providing a compressed bitstream including video data and bit rate information in accordance with one embodiment of the present invention.

FIG. 3A is a high level block diagram of a system 250 for providing a compressed bitstream including video data and bit rate information in accordance with one embodiment of the present invention. The system 250 comprises an encoder apparatus 252, a processing apparatus 253 and a transmitter 254. The encoder apparatus 252 is coupled to receive input bitstreams 258 that includes audio, video and general data. The input bitstreams 258 may be previously separated from a program to be transmitted to a residential user, for example. The encoder apparatus 252 compresses the input bitstreams and outputs a compressed bitstream 260 including the audio, video and general data in a suitable compression format, e.g., MPEG-2. The encoder apparatus 252 may be a single hardware and/or software structure or multiple hardware and/or software structures. In one embodiment, the encoder apparatus 252 implements ASIC basic hardware. In another embodiment where storage based multicasting of pre-encoded content is the application, the encoder apparatus 252 is implemented in software.

During encoding, encoder apparatus 252 generates bit rate information 262 describing the coding conditions of the audio, video and general data. In one embodiment, the bit rate information includes all parameters generated by the encoder apparatus 252 during the encoding process but are not needed by a typical decoder to perform decoding. The processing apparatus 253 collects and outputs the bit rate information 262 describing the bit rate of the video data. As will be described below, the processing apparatus 253 may further process the bit rate information 262 to provide an alternate measures of the bit rate. In addition, the encoder apparatus 252 may also be configured to receive the bit rate information and output the bit rate information in a compressed format. The compressed bitstream 260 and the bit rate information 262 are then received by the transmitter 254 that transmits an output compressed bitstream comprising the compressed bitstream including the video data and transmits the bit rate information onto a network 264. In one embodiment, the transmitter 254 transmits the compressed bitstream 260 and the bit rate information 262 together in the same compressed bitstream. More specifically, the bit rate information 262 is embedded in compressed bitstream 260 before transmission onto the network 264.

Figure 3B:
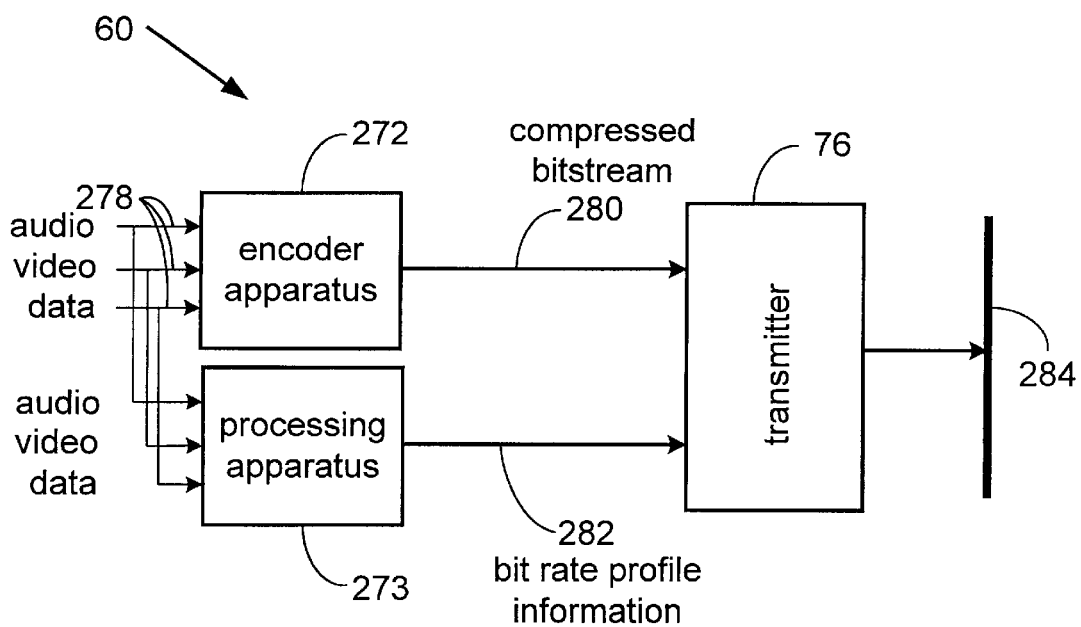
FIG. 3B is a high level block diagram of a network device that provides a compressed bitstream including video data in accordance with another embodiment of the present invention.

FIG. 3B is a high level block diagram of the network device 60 that provides a compressed bitstream including video data in accordance with another embodiment of the present invention. The network device 60 comprises the encoder apparatus 74, a processing apparatus 273 and the transmitter 76. The encoder apparatus 74 is coupled to receive input bitstreams 278 that include audio, video and general data. The encoder apparatus 74 compresses the input bitstreams and outputs a compressed bitstream 280 including the audio, video and general data in a suitable compression format, e.g. MPEG-4.

The processing apparatus 273 is also coupled to receive the input bitstreams 278 containing uncompressed data. The processing apparatus 273 generates and outputs the bit rate information 282 including video pre-compression coding information describing the bit rate information of the audio, video and general data. In this case, the processing apparatus 273 generates and outputs bit rate information 282 before the encoder apparatus 272 receives the video data. The compressed bitstream 280 and the bit rate information 282 are then received by the transmitter 76 that transmits the compressed bitstream 280 and the bit rate information 282 onto a network 284. In one embodiment, the transmitter 76 transmits the compressed bitstream 280 and the bit rate information 282 separately in different channels.

Figure 3C:
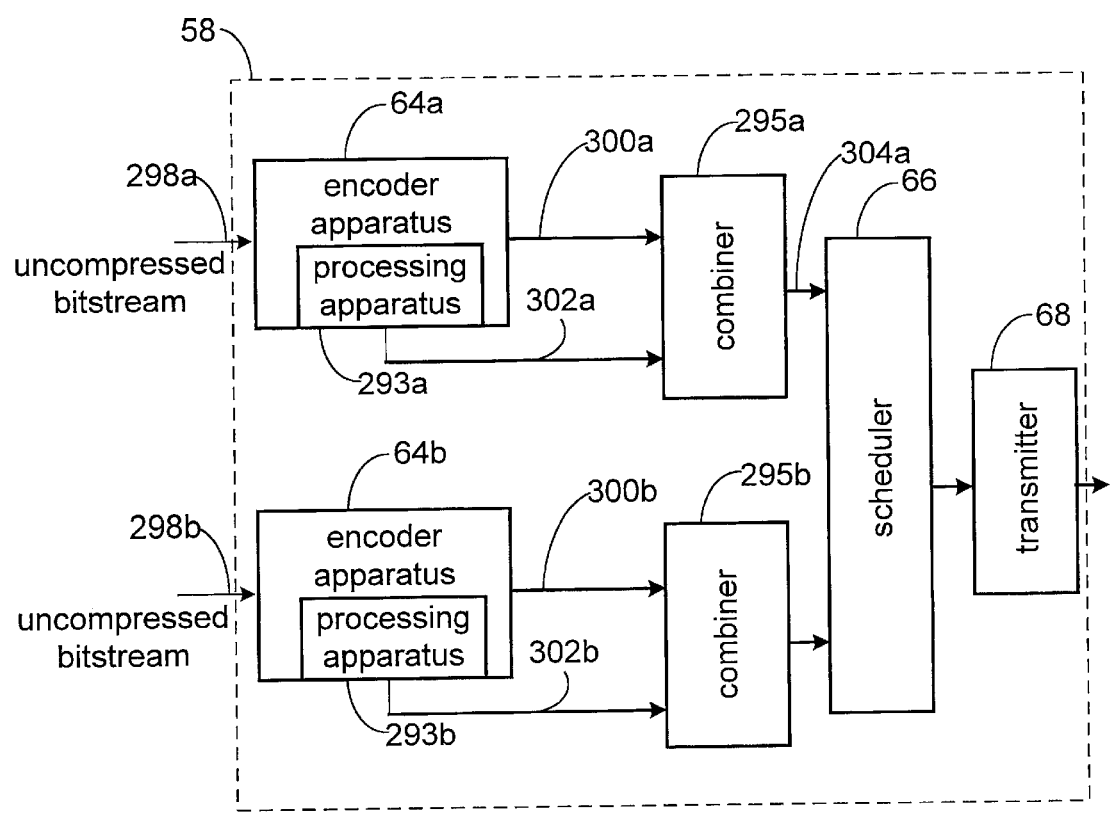
FIG. 3C is a high level block diagram of a network device that provides multiplexed compressed bitstreams including video data and bit rate information in accordance with another embodiment of the present invention.

FIG. 3C is a block diagram of the network device 58 that provides multiplexed compressed bitstreams including video data and bit rate information in accordance with another embodiment of the present invention. The network device 58 comprises an encoder apparatus 64, a processing apparatus 293, combiners 295a and 295b, the scheduler 66 and the transmitter 68. The encoder apparatus 64 includes the encoder portions 64a and 64b, each of which are coupled to receive input uncompressed bitstreams 298a and 298b, respectively, that include audio, video and general data. The encoder portions 64a and 64b each compress its corresponding uncompressed bitstream and output compressed bitstreams 300a and 300b respectively.

During encoding, encoder portions 64a and 64b generate bit rate information 302a and 302b describing the bit rate of the video data they are compressing. The processing apparatus 293 includes first and second processor portions 293a and 293b associated with the encoder portions 64a and 64b, respectively. Each processing portion 293a and 293b collects and outputs bit rate information 302a and 302b, respectively, from its associated encoder portion. Thus, the first processor portion 293a is responsible for outputting the bit rate information describing the bit rate of the compressed first video data and the second processor portion 293b is responsible for outputting the second bit rate information describing the bit rate of the compressed second video data. As one of skill in the art will appreciate, the processing apparatus 293 may be a single hardware and/or software structure or multiple hardware and/or software structures.

For the network device 58, each compressed bitstream and its corresponding bit rate information are then sent to a combiner that combines the bit rate information with the compressed bitstream. For example, the compressed bitstream 300a and bit rate information 302a are sent to the combiner 295a that embeds the bit rate information 302a into the compressed bitstream 300a to form a modified compressed bitstream 304a. Typically, the combiners 295a and 295b embed the bit rate information into a compressed bitstream such that the bitstream can be correctly received by a network device regardless if the network device can use the embedded information. For example, the bit rate information is embedded such that it may be received by both the network device 92 of FIG. 5A and by conventional receivers. In the MPEG standard for example, this means that the modified compressed bitstream 304a can be correctly decoded by any conventional MPEG-2 compliant decoders, which may or may not be able to use the embedded information. But to a network device of the present invention such as the network device 92 of FIG. 5A, the embedded bit rate information may be identified, extracted and used for more effective multiplexing, transcoding and bit rate adjustment. In a specific embodiment, the combiner 295a embeds the bit rate information 302a in a user data portion of the compressed bitstream including the video data.

The scheduler 66 is configured to receive the first compressed bitstream 300a and receive the second compressed bitstream 300b, configured to use the bit rate information 302a describing the bit rate of the first video data to schedule the first compressed bitstream 300a and the second compressed bitstream 300b, and configured to output a compressed bitstream including the first video data and the second video data. The compressed bitstream comprising the first video data, the second video data and the bit rate information is then provided to the transmitter 68 for output from the network device 58 and over the medium 70.

Having briefly discussed exemplary architecture for the network devices that produce compressed bitstreams and bit rate information in accordance with some embodiments of the present invention, bit rate information generation and embedding in accordance with several specific embodiments will now be described.

In one embodiment, bit rate information is obtained during compression of the video data. International standards have been created on video compression schemes. These include MPEG-1, MPEG-2, MPEG-4, H.261, H.262, H.263, H.263+, etc. These standardized compression schemes rely on several algorithm schemes such as motion compensated transform coding (for example, DCT transforms or wavelet/sub-band transforms), quantization of the transform coefficients, and variable length coding (VLC). The motion compensated encoding removes the temporally redundant information inherent in video sequences. The transform coding enables orthogonal spatial frequency representation of spatial domain video signals. Quantization of the transformed coefficients reduces the number of levels required to represent a given digitized video. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above-described schemes is called an encoder or encoding apparatus. In one embodiment, the bit rate information includes information describing compression of the video data by the encoder apparatus. In a specific embodiment, the bit rate information describes the coding parameters at same or different coding conditions for compressed bitstream as produced during encoding.

For bit rate information obtained during compression of the video data, the bit rate information may include coding statistics information generated during the encoding process. The coding statistics information may include parameters such as a video image compression complexity, a picture coding type, the number of bits used in coding the pictures, a general measure of the amount of motion, and impending picture information. In an MPEG specific embodiment, the video image compression complexity may be, for example, measured as the multiplication of the quantization value of the coded video data and the number of bits used to code the picture. The picture coding type refers to the specific format used to compress the picture. The number of bits used in coding the pictures may be provided, for example, for a number of pictures in a time-window of the near future. The general measure of the amount of motion may be measured in, for example, arithmetic and/or absolute sums of all motion vectors in one or more video frames. Impending picture information may include the location of fades, scene cuts, panning action, wipes, etc., as well as any impending high motion and texture content.

The above example describes the bit rate information and coding statistics obtained via compression. In another embodiment, bit rate information may be obtained on uncompressed video data. This is referred to herein as pre-compression coding information. Examples of pre-compression statistics include image by image differences between consecutive video image sequences, average brightness of each video image, measures of spatial and temporal complexity, etc. Obtaining such information requires the presence of uncompressed video data, which may be at the input of an encoder, or at the output of a decoder.

Although the remaining discussion will focus primarily on embedding bit rate information in various layers of an MPEG-2 transmission bitstream, the present invention is not limited to embedding within a bitstream of any format. In other words, bit rate information embedding in accordance with the present invention may be implemented in any public or proprietary format and any portion therein as one skilled in the art will appreciate.

Figure 4A:
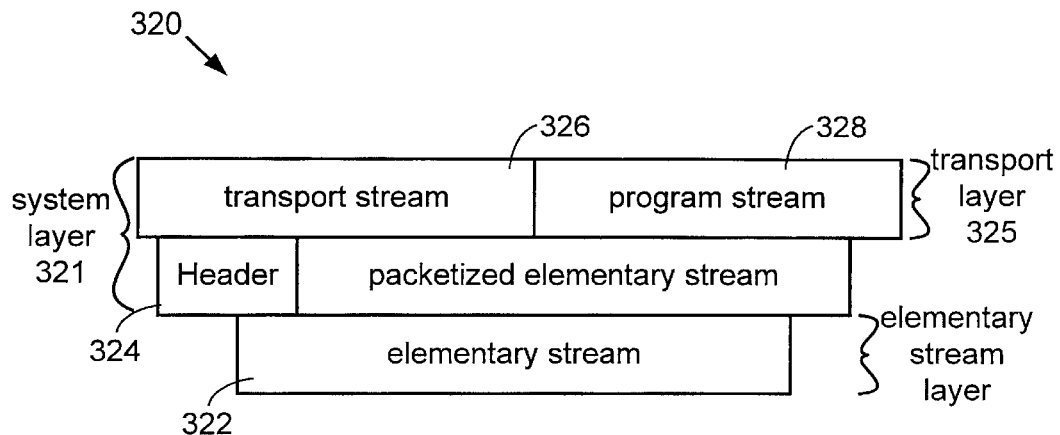
FIG. 4A illustrates a compressed bitstream having an MPEG-2 format in accordance with one embodiment of the present invention.

FIG. 4A illustrates a compressed bitstream 320 having an MPEG-2 format in accordance with one embodiment of the present invention. The MPEG-2 compression standard consists of two layers: a system layer 321 an elementary stream layer 322. The system layer 321 comprises two sub layers: a packetized elementary stream (PES) layer 324 and transport layer 325 above the PES layer 324. The transport layer 325 is further divided into a transport stream 326 and a program stream 328. In accordance with one embodiment of the present invention, bit rate information may be embedded in one of the transport stream 326, the PES layer 324, and the private data in elementary stream layer 322 of the MPEG-2 bitstream. Typically, the information is embedded according to the syntax of each layer as will be described below.

The elementary stream layer 322 contains the coded video data and defines how compressed video (or audio) data signals are sampled, motion compensated, transform coded, quantized and represented by different variable length coding (VLC) tables. The basic structure for the coded picture data is a block which is an 8 pixel by 8 pixel array. Multiple blocks form a macro block, which in turn forms part of a slice. A coded picture consists of multiple slices. Multiple coded pictures form a group of pictures. Such hierarchical layering of data structures allows processing and bit rate information generation in accordance with the present invention to occur on any layer. The MPEG-2 syntax also specifies private user data fields within the elementary stream layer 602. The private user data fields may be either of variable length or fixed length. In one specific embodiment, bit rate bit rate information is embedded as a data structure in one or more private user data fields in the elementary stream layer 602. In a specific embodiment, the bit rate bit rate information is inserted into the elementary stream of the MPEG-2 transmission bitstream just before the picture data fields.

Figure 4B:
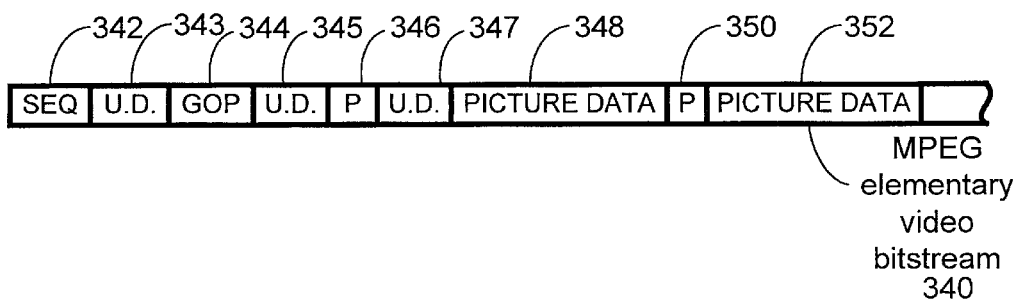
FIG. 4B illustrates the embedding of bit rate information into an MPEG elementary video bitstream to produce an output MPEG elementary bitstream in accordance with a specific embodiment of the present invention.
Figure 4B:
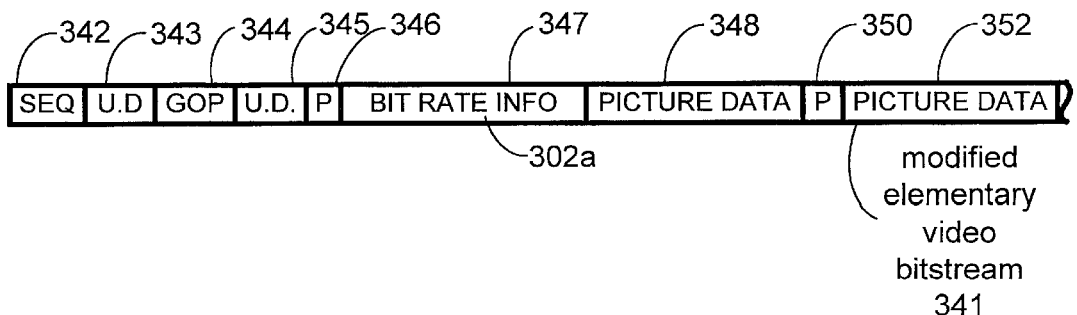

FIG. 4B illustrates the embedding of bit rate bit rate information 302a into an MPEG elementary video bitstream 340 to produce an output MPEG elementary video bitstream 341 in accordance with a specific embodiment of the present invention. The MPEG elementary video bitstream 340 includes start code indicating processing parameters for the bitstream 340 such as a sequence start code 342, a sequence extension including a user data header 343, a Group of Pictures (GOP) header 344, a user data header 345, a picture header 346, and a picture coding extension that includes a user data extension 347. Picture data 348 follows the picture header 346. The bitstream 340 includes a second picture header 350 preceding picture data 352.

The embedding of the bit rate bit rate information 302a into the bitstream 340 includes the insertion of information 302a within the user data header 347. The MPEG standards allow for a region in the user data header 347 to be used for user-defined information. Preferably, when the bit rate bit rate information 302a is inserted within the user data header 347, it is inserted in this space set aside for user defined information. Embedding of the bit rate bit rate information 302a into the bitstream 340 may be performed by the combiner 295a of FIG. 3C.

The bit rate bit rate information 302a, when embedded in the user data header 347, must be done in such a way to avoid any start code emulation. Within the MPEG syntax, start codes signal the end of one type of header field and the start of another. A falsely emulated start code may cause parsing errors as it falsely terminates one header section and starts another header section. Thus, the compressed video data is inserted such that it does not emulate a start code that may incorrectly signal the end of the extension and user data section. For MPEG-2, one start code is a byte-aligned 32 bit word that starts with 0x000001 (binary '0000 0000 0000 0000 0000 0001', which must occur at byte boundaries), followed by another 8 bit value. Not having start code emulated falsely within the user data section allows an MPEG decoder or bit rate information extractor to correctly extract the bit rate information contained in the user data section. One embodiment of the present invention includes bit scrambling in the user data section such that no start code pattern (0x00000) appears in the user data. In a specific embodiment, a single '1' bit is inserted for every $22^{nd}$ bit of user data, thus eliminating any possibility of emulating start code prefix.

The functions of the fields described above are well known to one of skill in the art and are described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818 "Generic coding of moving pictures and associated audio information", November 1994, which is herein incorporated by reference. The present invention is also suitable for use with the MPEG-4 specification, described in ISO/IEC International Standard 14496; "Coding of moving pictures and associated audio information", March 2000, which is herein incorporated by reference.

The system layer 321 is defined to allow an MPEG-2 decoder to correctly combine and separate audio, video and data bitstreams, and decode audio and video signals and present the decoded result to a video screen and speakers in a time continuous manner. The system layer 321 also includes provisions that allow multiplexing and separation of audio and video compressed signals as well as multiplexing and separation of different channels of audio and video compressed signals. The first sublayer in the system layer 321 consists of the PES layer 324. The PES layer 324 defines how the elementary stream layer is encapsulated into variable length packets called PES packets. In addition, the PES layer 324 includes presentation and decoding timestamps for the PES packets.

The transport layer 325 defines how the PES packets are further packetized into fixed sized transport packets, e.g. packets of 188 bytes to produce a transport stream. Additional timing information and multiplexing information may be added by the transport layer 324. The transport stream 326 is optimized for use in environments where errors are likely such as storage or transmission in a lossy or noisy media. Applications using the transport stream 326 include Direct Broadcast Service (DBS), digital or wireless cable services, broadband transmission systems, etc. The program stream 328 defines how the PES packets are encapsulated into variable sized packets and may also include additional timing and multiplexing information. The program stream 328 is designated for use in relatively error free environments and is suitable for applications that involve software processing of system information such as interactive multimedia applications. Applications of program stream 328 include Digital Versatile Disks (DVD) and video servers.

In one embodiment for embedding bit rate information in the PES layer 324 of an MPEG bitstream, bit rate information is embedded in the payload of PES packets with each PES packet having a different reserved stream ID. Presentation Time Stamps (PTS) and Decoding Time Stamps (DTS) in the PES header are used to provide synchronization between different PES packets corresponding to related bit rate information. The PTS and DTS may also be used to provide synchronization between PES packets. For an MPEG program stream, the PACK packet format may be used to multiplex the combined PES packetsCORRECT. When bit rate information is contained in a PES packet, the bit rate information may be placed inside the PES packet header PES_packet_data_byte field. This avoids any start code emulation problems because the PES header contains a field that defines the length of PES_packet_data_byte field before the user data byte appears in the bitstream. This allows the PES header parser to extract all of the bytes of PES_packet_data_byte without inspecting the content of the data section.

In another embodiment for embedding bit rate information in an MPEG bitstream, the bit rate information may be embedded in the MPEG transport stream 326. In one specific embodiment, the bit rate information is placed in separate transport packets included in the transport stream 326 and each transport packet is identified by a unique packet identification (PID). The bit rate information may be stored as the payload of the transport packets. Association between bit rate information and corresponding transport packets of a single video program may be achieved through descriptors in the program mapping table (PMT).

In another specific embodiment, the network device 58 of FIG. 3C provides bit rate information 302*a* in an MPEG-2 transport stream according to the following process:

dedicating a program ID (PID) to carry the bit rate information.

encapsulating the bit rate information into an MPEG-2 transport packet payload and assigning a dedicated PID to the packet. Together, all packets including bit rate information may form a bit rate information transport stream.

multiplexing the bit rate information transport stream with the transport streams containing the compressed audio, video and data streams in a synchronized fashion.

transmitting the resulting transport stream multiplex.

In order to reduce the overhead caused by embedding bit rate information, the bit rate information is preferably packetized in an efficient manner. Thus, in the last example of embedding bit rate information into the payload of transport stream packets, the number of bits used to represent the bit rate information is preferably minimized. In accordance with a specific embodiment of the present invention, a bit rate information table is used to efficiently packetize the information. The table includes a set of fields each pertaining to a parameter useful in describing the bit rate of video data. In one embodiment, a fixed number of bits is allotted (indicated in parenthesis below) for each field.

In a specific embodiment, bit rate information embedded in a compressed bitstream includes any one or more of the following fields in a table. An info_table_length field (8 bits) refers to the total number of bytes in this table, including this field. The value of this field is typically less than or equal to 184 bytes. A stream_id field (16 bits) is included to identify the transport stream that the bit rate information is carried in. An access_unit_index field (10 bits) identifies the table and increases by 1 each time a table is transmitted. By way of example, the count may range from 0 to 1023 and wrap back at 1023 to 0. A picture_coding_type field (3 bits) is included to identify the compression format used in encoding the video data. A number_of_bits_in_access_unit field (16 bits) refers to the number of bits in an access unit. The term access unit, as defined in the MPEG specification, refers to the number of bits used to encode a particular video image, along with necessary header information bits, and is preferably measured in multiple of 400 bits. A info_type_flag field (10 bits) indicates impending picture information included in post-generation such as scene cuts, fades, wipes, picture-in-picture to follow. If a scene cut is present, a scene_cut_frame_count_down field (6 bits) is included to identify the number of frames, not including this frame, before the scene cut occurs. If a fade is present, a fade_start_count_down field (6 bits) is included to identify the number of frames, not including this frame, before the fade occurs. A duration_of_fade field (6 bits) is included to identify the number of frames, inclusively, from the start of the fade to the end of the fade. If a wipe is present, a wipe_start_count_down field (6 bits) is included to identify the number of frames, not including this frame, before the wipe occurs. A wipe_duration (6 bits) is included to identify the number of frames, inclusively, from the start of the wipe to the end of the wipe.

The fields may also relate to picture level information. In one embodiment, the picture level information is grouped according to a Group of Pictures. In this case, a GOP_size (10 bits) is included to identify the size of the GOP. If coded macroblocks are used, a number_of_coded_macroblocks field (16 bits) may be included to provide number of coded macroblocks in a picture. Computationally expensive motion information may also be described in the bit rate information. For example, a motion_vector_sum_arith_X field (8 bits) may be included to provide the arithmetic sum of all motion vectors within this frame in the horizontal direction, measured in 400 pixels(pels) (or any suitable fixed value). Similarly, a motion_vector_sum_arith_Y field (8 bits) may be included to provide the arithmetic sum of all motion vectors within this frame in the vertical direction, measured in 400 pels (or any suitable fixed value). Motion information may also be described in absolute terms. In this case, a motion_vector_sum_abs_X field (8 bits) may be included to provide the absolute sum of all motion vectors within this frame in the horizontal direction, measured in 400 pels (or any suitable fixed value). Similarly, a motion_vector_sum_abs_Y field (8 bits) may be included to provide the absolute sum of all motion vectors within this frame in the vertical direction, measured in 400 pels (or any suitable fixed value).

Various encoding parameters may also be used in the bit rate information. For example, a quantization_measure field (10 bits) may be included to provide the sum of quantization_scale_values of all macroblocks, excluding uncoded macroblocks, measured in multiple of 1000 (or any suitable fixed value). In addition, various complexity measures may be used to provide the bit rate information. For example, a complexity_measure_type field (3 bits) may be included to indicate the complexity of the compression, which may vary depending on the encoder vendor since different complexity measures are used by different encoder algorithms. A complexity_measure_value field (10 bits) may also be included to provide some nominal scaled value In a specific embodiment, the nominal scaled value lies between 0 and 1023. For example, the complexity measure can be the sum of the product of quantization scale value for each macroblock and the number of bits used to encode the macroblock. The nomalization can be done by uniformly indexing the range of the above complexity measure to 0 to 1023, and set the complexity_measure_value field to such index. Additional fields may include a reserved_flag field (10 bits) to provide the number of bytes in a reserved field (defaulted 0). The reserved_field is optionally used to include additional bit rate information as desired. In some cases, a stuffing_byte field (8 bits) may also be used to fill up the entire transport packet payload.

In order to effectively extract and use the bit rate information, it is synchronized with a compressed elementary stream by the encoding multiplexer, e.g. the scheduler 66 of FIG. 3C in a timely manner. In one embodiment, the bit rate information is inserted prior to the start of the access unit it is associated with More specifically, it is inserted just before the picture_start_code of the associated access unit, but not before the picture_start_code of the previous access_unit.

Figure 4C:
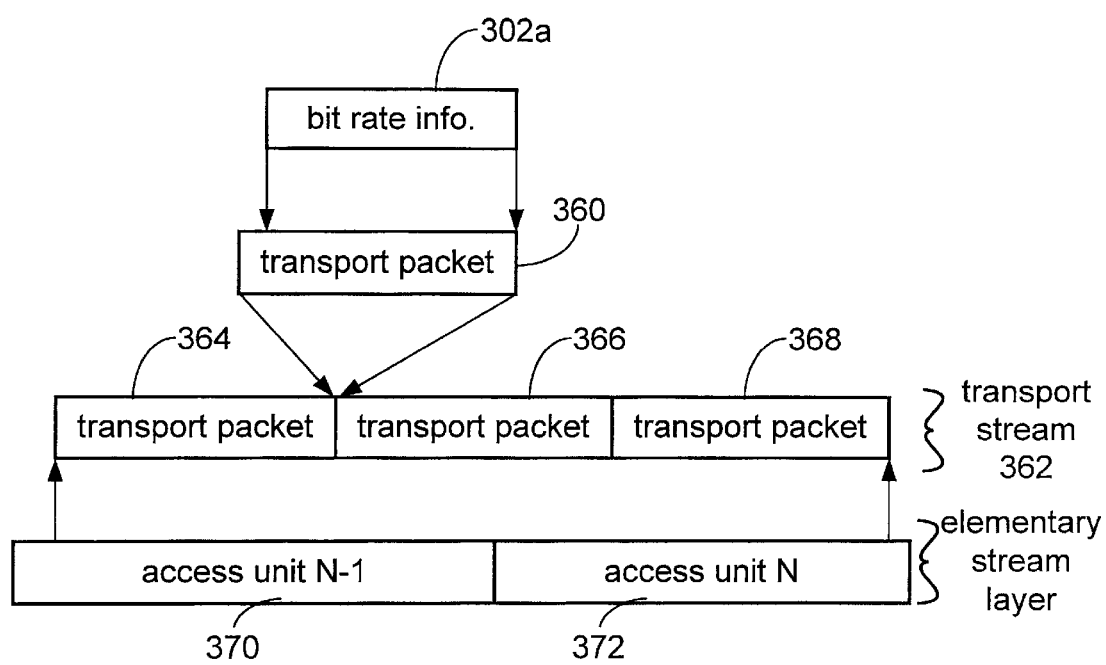
FIG. 4C illustrates the insertion of a transport packet containing the bit rate information into a transport stream according to one embodiment of the present invention.

FIG. 4C illustrates the insertion of a transport packet 360 containing the bit rate information 302a into a transport stream 362 according to one embodiment of the present invention. The transport stream 362 includes three transport packets 364, 366 and 368 that contain packetized data from access unit (N−1) 370 and access unit (N) 372. The access units (N−1) 370 and (N) 372 are included in an elementary stream that contains the compressed video data to be transmitted. The transport packet 360 contains bit rate information for the access unit (N) 372. Correspondingly, the transport packet 360 is embedded just before the start of access unit (N) 372—between the transport packets 366 and 368.

Having briefly discussed bit rate information generation and embedding in accordance with several specific embodiments of the present invention, bit rate information extraction and use for multiplexing in accordance with several specific embodiments will now be described.

Figure 5A:
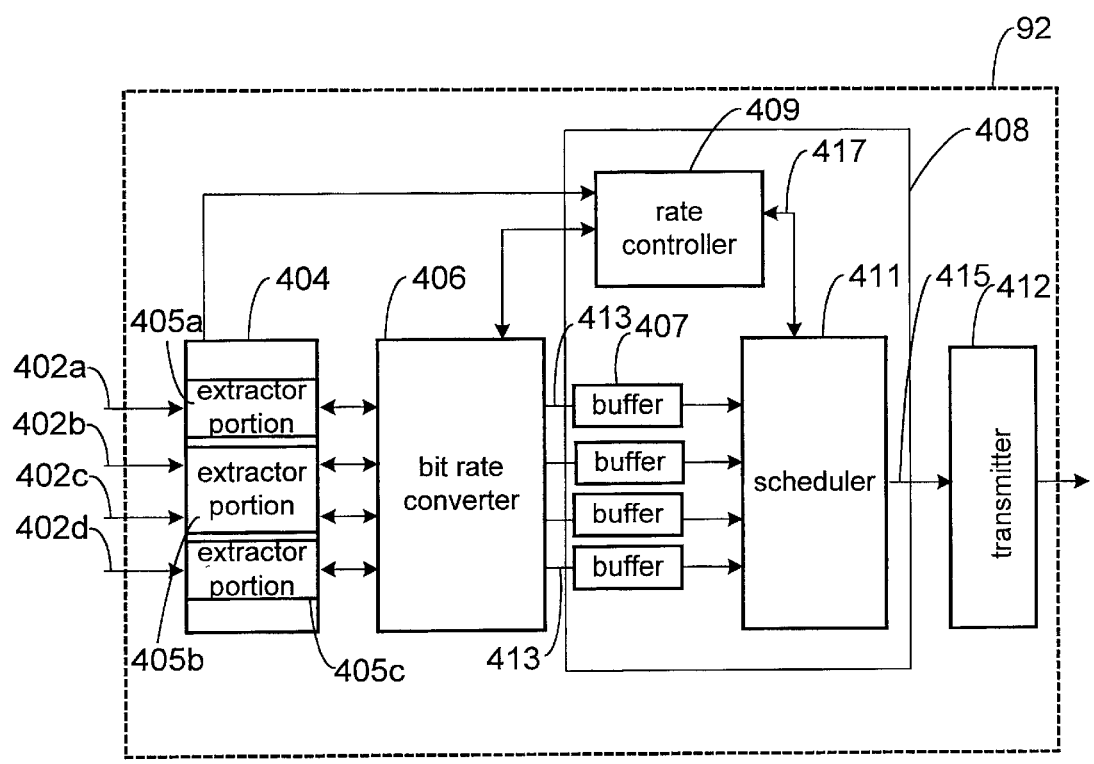
FIG. 5A illustrates a network device that performs efficient scheduling and multiplexing in accordance with one embodiment of the present invention.

Referring now to FIG. 5A, a first embodiment for the network device 92 of FIG. 2 comprises: an extractor apparatus 404, a bit rate converter apparatus 406, a multiplexer 408, and a transmitter 412. The multiplexer 408 comprises a rate controller 409 and a scheduler 411. The scheduler 411 determines the relative order of transmission out of buffers 407. While the present invention will now be described as an apparatus composed of units, those skilled in the area will recognize that the present invention encompasses a method, process or software having as steps the actions performed by each unit and described below.

The extractor apparatus 404 has a plurality of input lines 402a–d that receive pre-compressed bitstreams from a variety of sources using suitable receiving components. For example, input line 402a is coupled to a satellite receiver that receives compressed video data from a satellite based communication system. Input line 402b is coupled to a network interface that receives compressed video data from an Internet network including a series of ATM based routers which route the compressed video data to the network device 92. Input line 402c is coupled to a receiver that receives compressed video data from a terrestrial source and the receiver may also include a suitable frequency demodulation and descrambling facilities. The line 402d is coupled to a network interface that receives compressed video data from an Internet network using IP protocol that routes a compressed bitstream from a video streaming server to the network device 92.

The extractor apparatus obtains bit rate information describing the bit rate of the video data. The extractor apparatus 404 includes a plurality of extractor portions 405a–c that receive compressed bitstreams from the input lines 402a–d and obtain bit rate information describing the bit rate of video data included in each compressed bitstream. More specifically, the extractor portion 405a obtains bit rate information describing the bit rate of video data included in the compressed bitstream received on line 402a while the extractor portion 405b obtains bit rate information describing the bit rate of video data included in the compressed bitstreams received on lines 402b and 402c. In one embodiment where the bit rate information is stored in a storage location of the compressed bitstream, the extractor apparatus 404 knows potential locations where the bit rate information may be stored, checks each location, and extracts the bit rate information from the storage location when found. The extractor apparatus 404 may also depacketize the bit rate information into data streams before outputting the bit rate information to the rate controller 409. The extractor apparatus 404 may also parse any timing, programming, and other auxiliary information, and remove all stuffing data bits, if appropriate. The compressed bitstreams, minus the bit rate information, are then provided to the bit rate converter apparatus 406.

When necessary, the bit rate converter apparatus 406 transcodes one or more compressed video bitstreams. Broadly speaking, transcoding refers to altering data or information in a compressed bitstream without changing the format of the compressed bitstream. When desirable, the network device 382 may alter the bit rate of the compressed bitstreams transmitted in the output multiplex based on the bit rate capacity of the channel between the network device 92 and the target decoder. For example, the bit rate converter may adapt the bit rate of the first compressed bitstream. Bit rate conversion of a compressed bitstream refers to the process performed on modified compressed bitstreams that results in a different transmission bit rate than the originally compressed bitstream. The bit rate conversion may occur on any one or more of the compressed bitstreams received by the network device 92. In a typical scenario, the new bit rate for the output multiplexed compressed bitstream is smaller than the original bit rates of the input compressed bitstreams, but sometimes the resulting bit rate can also be greater than the original bit rates. In other scenarios, the output multiplexed compressed bitstream may be delivered to different transmission channels each having a different channel capacity and the bit rate for each channel may be tailored accordingly. By way of example, two compressed bitstreams received at 4 Mbps and 2 Mbps (total input=6 Mbps) may be combined and bit rate converted by the bit rate converter apparatus 406 to a multiplexed compressed transmission bitstream of 1.5 Mbps for a channel capable of delivering only 1.5 Mbps. The same modified compressed bitstreams may also be combined and bit rate converted by the bit rate converter apparatus 406 to a compressed transmission bitstream of 3 Mbps for a channel capable of delivering only 3 Mbps. In this case, the data and bit rate conversion process is intended to remove bits from the modified compressed bitstreams so that the new bitstreams are still compliant to the given compression syntax, and can be decoded by the receiver, albeit at a possibly lower quality than the originally compressed bitstream. Bit rate conversion of a compressed bitstream is further described in commonly owned co-pending U.S. Patent Application entitled "A System and Method for Transporting Compressed Video and Data Bitstream Over a Communication Channel" by Ji Zhang et al., filed on Oct. 10, 1997 (U.S. application Ser. No. 08/947,480), which is incorporated by reference herein. The output of the bit rate converter apparatus 406 is provided onto output lines 413.

Coupled to the extractor apparatus 404 and the bit rate converter apparatus 406 is a multiplexer 408 including a scheduler 411, which is configured to receive the first compressed bitstream 300a and receive the second compressed bitstream 300b. The scheduler 411 is configured to use the bit rate information 302a describing the bit rate of the first video data to schedule the first compressed bitstream 300a and the second compressed bitstream 300b. The scheduler 411 is also configured to output a multiplexed compressed bitstream 415 including the first video data and the second compressed video data. In one embodiment, the multiplexed compressed bitstream 415 has a substantially constant bit rate. The multiplexer 408 also includes the rate controller 409 and a set of multiple input buffers 407. The input buffers 407 temporarily store compressed video data received from the transcoder 406 for each of the input compressed bitstreams until the scheduler 411 processes the compressed video data for transmission. In one embodiment, the multiplexer 408 is an open loop multiplexer.

The rate controller 409 connects to both the bit rate converter apparatus 406 and the scheduler 411 and determines what bit rate is to be used for each input compressed bitstream. More specifically, based on messages received from the rate controller 409, the bit rate converter apparatus 406 adjusts the bit rate for each compressed bitstream. In one embodiment, the objective of the rate controller 409 is to determine whether to apply more aggressive transcoding and bit rate conversion to a particular compressed bitstream and use the saved bandwidth resulting therefrom for a different compressed bitstream. In a statistical re-multiplexing environment for example, if a particular compressed bitstream is encoded with fewer number of bits, then the remaining compressed bitstreams in the multiplex will be able to use more bits, resulting in a quality trade-off between different compressed bitstreams via bandwidth re-allocation. Transferring saved bandwidth in this manner may result in improved video quality for the end-user.

The rate controller 409 relies on the bit rate information extracted by the extractor apparatus 404 as will be described in further detail below. The rate controller 409 may also rely on information regarding the channel that the output re-multiplexed bitstream 415 is to be transmitted onto. For example, the rate controller 409 may be coupled to receive a rate value from an RADSL transmitter in an ADSL embodiment or to receive a rate value from an ATM network in an ATM environment. A control signal is provided by the rate controller 409 to the bit rate converter apparatus 406 and the scheduler 411. The control signal specifies the amount of modifying the bit rate converter apparatus 406 performs to achieve the desired output bit rate from the network device 92.

The scheduler 411 comprises four inputs that are coupled to the buffers 407, an input line 417 from the rate controller 409, and an output line 419. The scheduler 411 selectively combines the compressed bitstreams to form the re-multiplexed compressed bitstream 415. The scheduler 411 may also insert any headers, stuffing bits, filler packets as appropriate. In one embodiment, the scheduler 411 selectively multiplexes the compressed video data according to relative bit rates of the compressed video data as provided by the bit rate information extracted by the extractor apparatus 404.

In another embodiment, the multiplexer 408 is a statistical re-multiplexer and the scheduler 411 combines the compressed video data according to a suitable statistical re-multiplexing protocol or algorithm. Statistical re-multiplexing, in general, is a technique that simultaneously encodes and combines multiple channels of video signals into a single bitstream for transmission. The main difference between statistical multiplexing and statistical re-multiplexing is that the inputs to the statistical re-multiplexer are pre-compressed bitstreams. The re-encoding, together with bit rate control and re-multiplexing performs substantially the same functions as that of statistical multiplexing. Advantageously, statistical re-multiplexing allows the statistical multiplexing on pre-compressed video signals without the use of real-time compression systems. It should be noted that, while the discussion herein primarily refers to multiplexing, any of the techniques described herein are also suitable for use with pre-compressed bitstreams and re-multiplexing and discussion of multiplexing is intended to be inclusive of any form of multiplexing such as re-multiplexing of compressed bitstreams. For example, although the network device of FIG. 5A has primarily been discussed with respect to the multiplexer 408, e.g., a device that combines bitstream representations of multiple signals, such as audio, video, or data, into a single bitstream, it is understood the multiplexer 408 also acts as a re-multiplexer used to combine multiple bitstream representations of previously multiplexed signals.

As mentioned before, statistical multiplexing takes advantage of the VBR nature of multiple compressed video signals. In one embodiment, when the scheduler 411 combines multiple bitstreams, the bit rate of each VBR bitstream may be adjusted but the total bit rate of the multiplexed compressed bitstream 415 is kept at a constant value. Scheduling in this manner is an effective way to optimize the quality of compressed video signals under the constraint of a fixed total transmission bandwidth, e.g., one imposed by the channel capacity of a channel. The resulting improvement can be described in terms of the so called 'statistical gain', which can be measured either in terms of the improvement of subjective visual quality of the decoded video, or the objective average reduction in quantization value, or in terms of the reduction of the quantization value variability (statistical variance), etc.

In one specific embodiment, scheduling and statistical multiplexing on an MPEG bitstream includes the following procedures:

- analysis of video content to determine the optimal bit budget allocation to each input bitstream and possible impact on underlying video quality at different bit budget allocation.
- coded picture decisions such as whether to use motion compensation.
- coordinated selection of bit rates across all input bitstreams to result in a total fixed rate.
- picture coding for each input bitstream that meets the bit usage budget determined by the previous procedure, also called rate control as described above with respect to the bit rate converter 406.
- monitoring and compensation of timing information on all bitstreams, e.g., in order to carry real-time compressed bitstreams.
- scheduling and multiplexing of different bitstreams into a fixed bandwidth channel.

Other suitable scheduling and statistical multiplexing techniques are further described is commonly owned, co-pending U.S. Patent Application entitled "System and Method for Multiple Channel Statistical Re-Multiplexing" naming Ji Zhang et al. as inventors, filed on Feb. 28, 2000 (U.S. application Ser. No. 09/514,577), which is incorporated by reference herein.

The output of the scheduler 411 and the re-multiplexer 408 is the multiplexed compressed bitstream 415, which is provided to the transmitter 412. The transmitter 412 is configured to transmit the multiplexed compressed bitstream 415 including the first video data and the second video data onto a suitable channel. The output of the transmitter 412 forms the output of the network device 92.

In order to increase transmission efficiency, the network device 92 relies on bit rate information being provided for at least one compressed bitstream being transmitted. However, it is feasible that many upstream encoders are not equipped with facilities to generate and provide bit rate information. This is the case for network device 62 of FIG. 2, for example. While compressed bitstreams produced from such a network device may still be multiplexed with compressed bitstreams including bit rate information by the network device 92 of FIG. 5A and achieve improved multiplexing, it is feasible for compressed bitstreams produced from the network device 62 to be multiplexed with compressed bitstreams from other encoders not equipped with facilities to generate and provide bit rate information. In other words, it is feasible for all input bitstreams to a network device not to include bit rate information. In such cases, network devices of the present invention may include processing apparatus to obtain bit rate information.

Figure 5B:
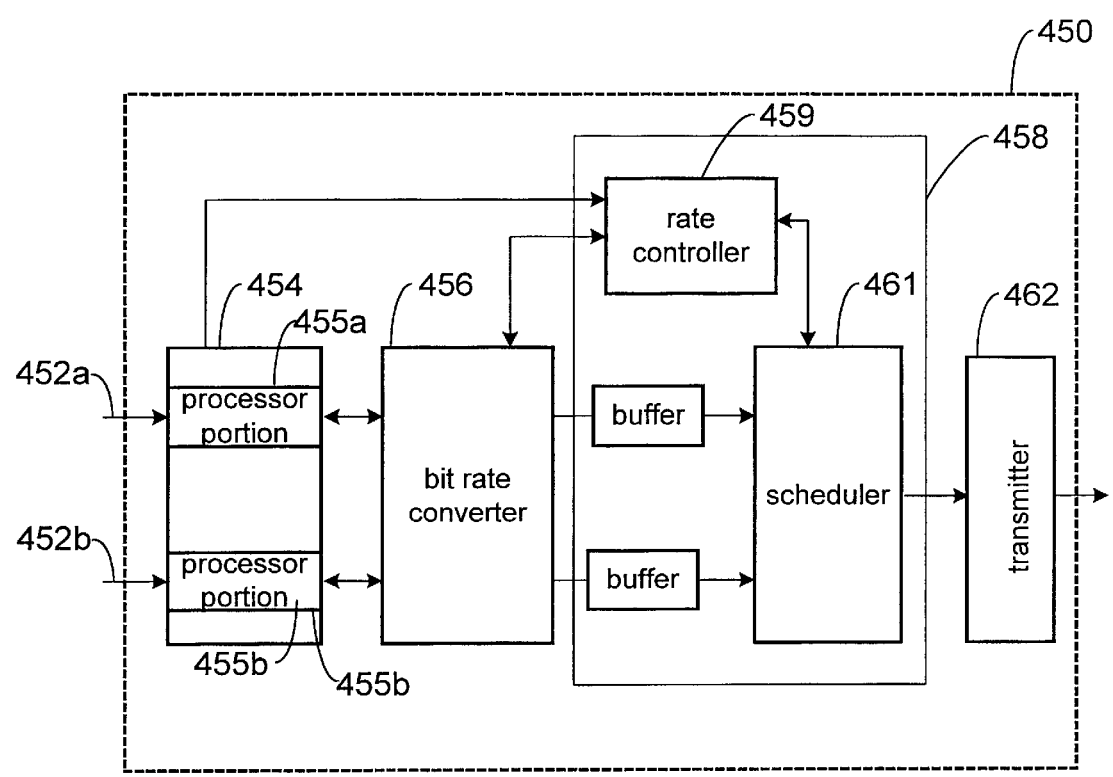
FIG. 5B illustrates a network device that performs efficient scheduling and multiplexing in accordance with another embodiment of the present invention.

FIG. 5B illustrates a network device 450 that performs improved multiplexing in accordance with another embodiment of the present invention. The network device 450 includes a processing apparatus 454, a bit rate converter apparatus 456, a multiplexer 458, and a transmitter 462. The multiplexer 458 includes a rate controller 459 and a scheduler 461.

The network device 450 has a plurality of input lines 452a and 452b that receive first and second pre-compressed bitstreams, respectively, using suitable receiving components. Coupled to the plurality of input lines 452 is the processing apparatus 454 that parses the first compressed bitstream and obtains bit rate information describing the bit rate of the first video data. The processing apparatus 454 includes a plurality of processing portions 455a–b. Each of the processing portions 455 obtains bit rate information describing the bit rate of video data included in the compressed bitstream that it receives. More specifically, the processing portion 455a obtains bit rate information describing the bit rate of video data included in the compressed bitstream received on line 452a and the processing portion 455b obtains bit rate information describing the bit rate of video data included in the compressed bitstreams received on line 452b. In one embodiment, the processing portion 455a parses the compressed bitstream received on input line 452a and obtains bit rate information describing the coding statistics of the video data in the compressed bitstream. In another embodiment, the processing portion 455a extracts a number of parameters describing the coding statistics of the compressed bitstream and forms an aggregate of the parameters that describes the bit rate of the video data in the compressed bitstream. Suitable parameters may include those parameters inserted by encoders, such as those described above.BIT RATE The compressed bitstreams are then provided from the processing apparatus 454 to the bit rate converter apparatus 456. For the network device 450, once the bit rate information has been obtained by the processing apparatus 454, the performance of the bit rate converter apparatus 456, the rate controller 459, the scheduler 461 and the transmitter 461 perform relatively similar to the namesake structures described above for the network device 92 of FIG. 5A.

Having briefly discussed exemplary architecture for the network devices that use bit rate information for more efficient multiplexing in accordance with some embodiments of the present invention, how a scheduler and multiplexer uses the bit rate information in accordance with several specific embodiments will now be described.

Generally speaking, the bit rate information can be used in different ways, depending on the type of information and particular scheduling scheme. For statistical multiplexing of multiple MPEG bitstreams using the network device 92 of FIG. 5A or the network device 450 of FIG. 5B, information such as picture coding type and picture coding size information, special effect information, GOP size, motion measure information, complexity measure information, quantization measure and number of coded macroblocks information may be used during scheduling.

More specifically, picture coding type (I, P or B pictures) and picture coding size information (number of bits used in coding this picture) can be used by the bit rate converter 406 and rate controller 409 to jointly determine how much transcoding is necessary on a bitstream. In addition, by using the bit rate information associated with numerous coded pictures, before the coded picture data enters the multiplexer buffers 407, the rate controller 409 may adopt a 'look-ahead' policy that makes scheduling and transcoding decisions based not only on the data to be immediately transmitted, but also on data to be transmitted ahead in time.

Special effect information such as scene cuts, fades, wipes, etc., are commonly found in a video sequence and are usually used during a transition in the video sequence. In general, human vision tolerates more visual artifacts during these transitions. However, when a video compressor is encoding the video data during a special effect, more bits are typically used for the corresponding coded picture. Within the compressed bitstream, it is generally difficult to obtain information about the special effect without computationally expensive complete decoding and re-encoding. Bit rate information including special effect information generated in advance and provided to the multiplexer thus eliminates the need for the often expensive processing required to obtain special effect information.

The multiplexer 408 may use scene cut information, for example, to flexibly adapt multiplexing of multiple bitstreams. More specifically, if the scheduler 411 knows which coded picture is the first picture after the scene cut, the rate controller 409 can adopt a more aggressive transcoding (bit rate reduction) on the coded pictures immediately following the scene cut, including the first picture. As human vision is generally less demanding on the video images immediate after a scene cut, this allows the scheduler 411 to 'steal' bandwidth from the pictures immediately following the scene cuts and use it to improve the picture quality of other channels within the same multiplex.

The scheduler 411 may also use fade information to flexibly adapt multiplexing of a bitstream. More specifically, the rate controller 409 may adopt a similar approach to that of the scene cut in stealing bandwidth from the pictures immediately following a fade and use it to improve the picture quality of other channels within the same multiplex. The motivation is similar: during a fade, human vision tends to notice artifacts less. In addition, the transcoding process, if applied, may achieve bit rate reduction on the pictures corresponding to the fades by cutting higher discrete cosine transform (DCT) coefficients (via either DCT coefficient truncation or spatial filtering). Knowing the duration of the fade ahead of time also allows the rate controller 409 to determine the duration of this adjusted bit rate control for the scheduler 411.

In addition to adjusted bit rate control for fades and scene cuts, the scheduler 411 may also use wipe information to flexibly adapt multiplexing of a bitstream in a similar manner as described for fades and scene cuts.

The bit rate information may also include GOP size information. The GOP (group of pictures) size is the number of coded pictures between two intra frames (frames containing full picture information which may be independently processed). In a sense, a GOP forms a self contained coded picture group that can be decoded by a decoder in a self contained manner. Conventionally, the multiplexer 408 must parse the last coded (I) picture of a GOP before knowing how big the GOP is. Thus, by including the GOP size with the bit rate information, the rate controller 409 can determine the GOP size without having to parse through the entire GOP, and adapt scheduling of the multiple input bitstreams accordingly.

In another embodiment, the bit rate information includes motion measure information. Motion measure information is used to describe the amount of motion in a video sequence. In the case of MPEG based video compression, the motion measure may be defined as the sum of a set of motion vectors. Often, there is a close correlation between the motion vectors and the direction of the actual motion within the video sequence. However, it should be noted that motion estimation in MPEG video compression is not intended to estimate the motion content of the video data, but intended to minimize the difference between the reference frame and the motion estimated frame. In other words, the motion vectors do not necessarily point to the direction of motion but to the direction of the motion estimated macroblock with the smallest residual difference.

In accordance with a specific embodiment, two types of motion measure may be used to construct the motion measure information. The first motion measure is the sum of absolute (unsigned) values of motion vectors in horizontal (X) and vertical (Y) directions. For example, the absolute horizontal (X) and absolute vertical (Y) measures for the two motion vectors (−2,3) and (5,4) are 7 and 7, respectively. The absolute motion measure is therefore 14. The second motion measure is the sum of arithmetic (signed) values of the motion vectors to horizontal (X) and vertical (Y) directions. Using the same two motion vectors, the arithmetic horizontal (X) measure is 3 and arithmetic vertical (Y) measure is 7 The arithmetic motion measure is therefore 10. If the absolute motion measure is much greater than the arithmetic motion measure, then the motion vectors are pointing in many different directions. Alternatively, if the absolute motion measure is very close to the absolute (unsigned) value of arithmetic motion measure, then there is highly consistent motion movement in the video sequence (even though the actual video sequence has not been decoded). This motion measure information can be used to determine the motion content within a video sequence. For example, if it is determined that the motion content is highly inconsistent (e.g., when the arithmetic motion measure is much less than the absolute motion measure), then more aggressive transcoding can be applied to the coded pictures of this bitstream because artifacts may be masked out. In addition, if there is a rapid increase in the absolute motion measure or the arithmetic motion measure, then there is an increase in motion content in the video sequence, implying more aggressive transcoding may be applied by the multiplexer 408 on the bitstream with greater amount of motion content.

In one embodiment, the bit rate information comprises information relating to the video data before encoding. For example, the bit rate information may also include a complexity measure, a quantization measure and a number of coded macroblocks. The complexity measure refers to how complex an underlying video image is and may be obtained directly from the uncompressed video sequences before encoding. The complexity measure can be used by the scheduler 411 to determine how many bits to allocate to the recoded pictures. Similar analysis may be performed by the scheduler 411 for the quantization measure and the number of coded macroblocks. These parameters, either alone or in combination, when obtained in advance of scheduling by the scheduler 411, allow the multiplexer 408 to determine the optimal bandwidth allocation for compressed bitstreams in the multiplex.

Even though a compressed bitstream typically comprises a combination, called a multiplex, of compressed audio, video and auxiliary data bitstreams, the bit rate information described herein has primarily referred to compressed video data. Although not detailed, it is understood that any compressed audio and auxiliary data, such as compressed audio and auxiliary data related to the output of the video data, may also be the basis for bit rate information as described herein.

Figure 6:
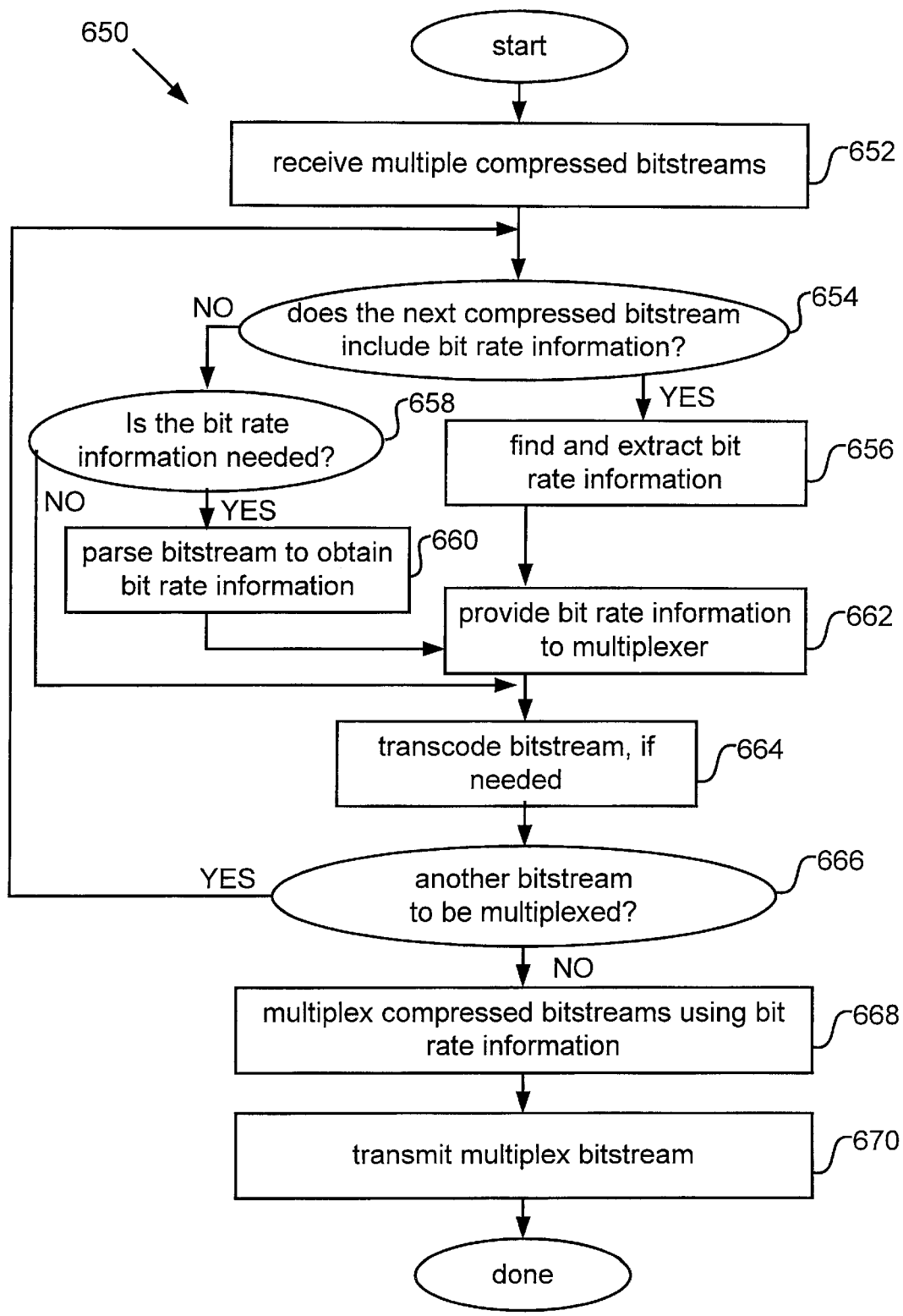
FIG. 6 illustrates a process flow for transmitting first video data and second video data over a transmission channel in accordance with one embodiment of the present invention.

FIG. 6 illustrates a process flow 650 for transmitting first video data and second video data over a transmission channel in accordance with one embodiment of the present invention. The process flow 650 may take place in any network device such as the network device 92 of FIG. 2. Processes in accordance with the present invention may include up to several additional steps not described or illustrated here in order not to obscure the present invention. While multiplexing and bit rate obtaining will now be described as a method, those skilled in the area will recognize that the present invention encompasses a system or software having units capable of performing the actions as described below.

The process flow 650 begins by receiving a first compressed bitstream including the first video data and a second compressed bitstream including the second video data (652) from one or more sources, e.g., satellite and Internet. In one embodiment, one of the first compressed bitstream and the second compressed bitstream has a variable bit rate profile. The process flow also includes obtaining bit rate information from the first compressed bitstream that describes the bit rate of the first video data. Thus, for each compressed bitstream to be multiplexed, the bitstream is checked for bit rate information (654). If present, the bit rate information is located and extracted from the compressed bitstream (656). If bit rate information is not included in the compressed bitstream as received and the information is needed for multiplexing (658), the compressed bitstream may be processed to obtain the bit rate information (660). Once the bit rate information is obtained, it is sent to a multiplexer included in the network device (662).

Transcoding, such as bit rate conversion, may be performed on any one of the compressed bitstreams to be multiplexed (664). In one embodiment, any transcoding is not performed until all the bit rate information has been obtained for all compressed bitstreams to be multiplexed. Bit rate alteration of one or more of the compressed bitstreams may be based on the bit rate capacity of the channel between the network device and the target decoder. In some embodiments, a compressed bitstream may be partially encoded or decoded to facilitate bit rate alteration. The bit rate alteration may then occur on the compressed video data or uncompressed video data or at any point therebetween while the data is partially encoded or decoded. By way of example, the bit rate alteration may include partial decoding via re-quantization and VLC encoding to reduce redundancy and produce a smaller compressed bitstream. Alternatively, the bit rate alteration may include full decoding and downsampling that takes a high resolution video data and converts it to a low resolution video data.

The above process is then repeated (654, 656/658+660, and 664) for each compressed bitstream received and to be multiplexed (666). The scheduler then schedules the first compressed bitstream including the first video data and the second compressed bitstream including the second video data using the bit rate information to provide a compressed bitstream comprising the first video data and the second video data. Once scheduling is complete, the multiplexed bitstream may then be transmitted onto a transmission channel to the target decoder/receiver as desired (670).

In the above described embodiments, the network devices generate the bit rate information in real-time. Bit rate information generation according to present invention may also be done in non-real-time or off-line on pre-stored bitstreams using general-purpose computers such as PCs or general-purpose workstations. In many applications, particularly in WebServer based IP streaming, a transmission bitstream including bit rate information is created and stored on a large capacity WebServer. In this case, the bitstream is encoded and stored before streaming. While the transmission bitstream is stored, a general-purpose computer may be used to generate and embed the bit rate information. Thus, the present invention may be performed in non real-time and by general-purpose computers. In one embodiment, embedding done on a general-purpose computer may be done entirely in software—providing for even broader application potential.

Figure 7:
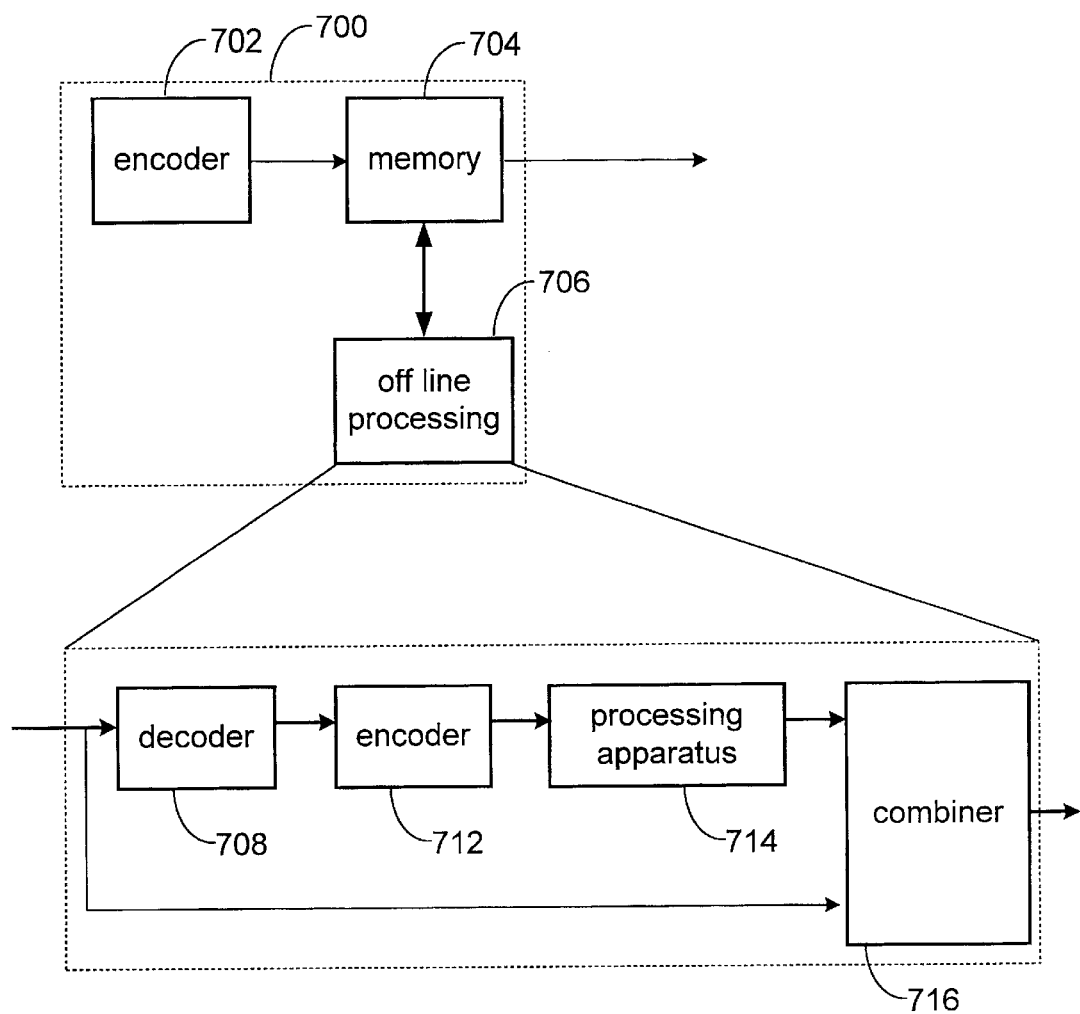
FIG. 7 illustrates a general-purpose computer for non real-time bit rate information generation and embedding in accordance with one embodiment of the present invention.

FIG. 7 illustrates a general-purpose computer 700 for non real-time bit rate information generation and embedding in accordance with one embodiment of the present invention, e.g., by network device 58 of FIG. 2. The computer 700 includes an encoder 702 that receives one or more uncompressed bitstreams an outputs corresponding compressed data streams. The compressed data streams are then stored in memory 704. While the compressed bitstreams are stored, one or more are retrieved for off-line processing 706. Off-line processing 706 comprises decoding by a decoder 708, encoding by an encoder 712, and generation of the bit rate information by a processing apparatus 714, either while the data is uncompressed or during compression by the encoder 712. The processing apparatus 714 outputs the bit rate information to a combiner 716 that embeds the bit rate information in the compressed bitstream to form a modified compressed bitstream. The output compressed bitstream comprising the video data and the bit rate information are then stored in memory 704. From this point, the modified compressed bitstream may be transmitted or multicast as desired.

Although the general-purpose computer 700 is illustrated to generate coding statistics in non real-time on compressed data streams, it should be noted that off-line processing 706 is also suitable for receiving the one or more uncompressed bitstreams (e.g., before compression) and generating pre-compression coding information for at least one of the input uncompressed bitstreams. In addition, the general-purpose computer 700 may also providing bit rate information having a combination of pre-compression coding information and encoding statistics generated during compression of the video data.

The methods of this present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 8:
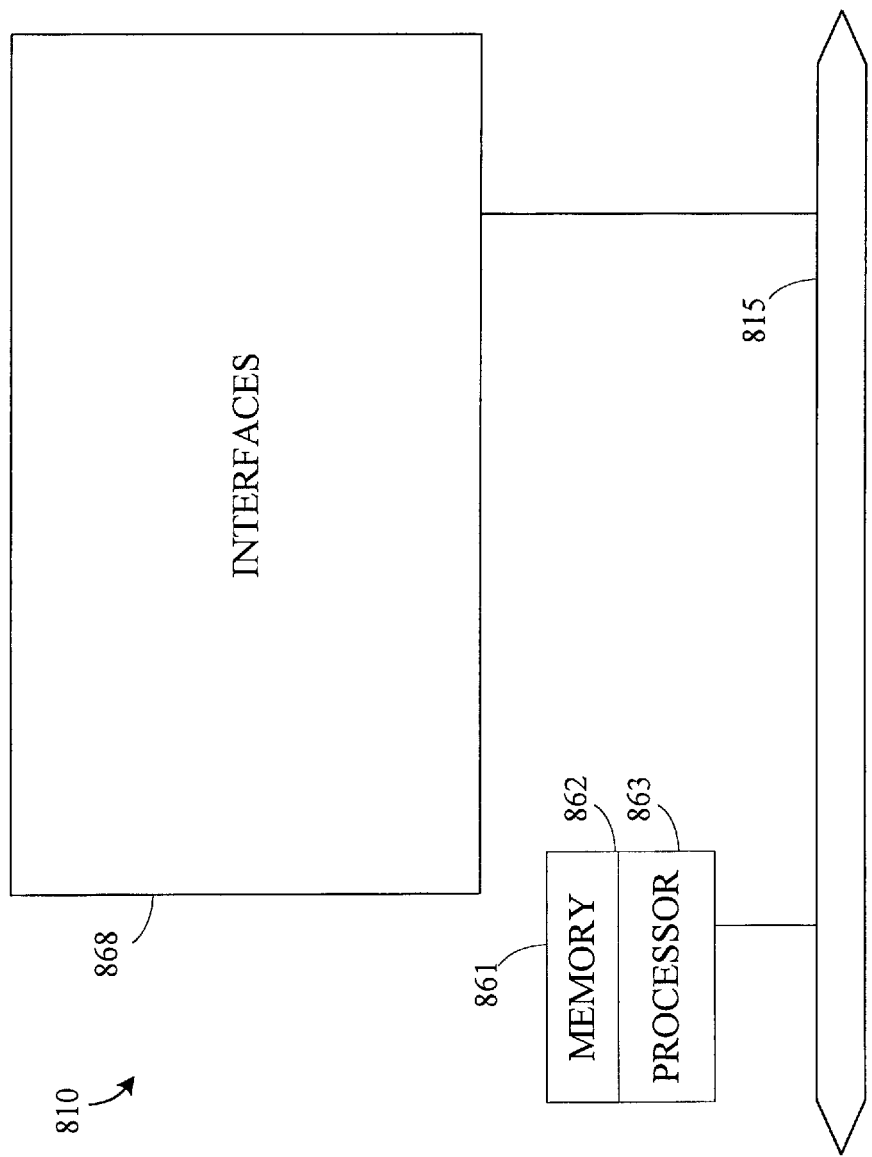
FIG. 8 is a block diagram of a router that may be used in conjunction with the methods of the present invention.

Referring now to FIG. 8, a high level block diagram of an exemplary general purpose router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

In one embodiment, the network device 276 shown in FIG. 2B is implemented as a video embedding line card. The line card behaves as video network device without any physical interface. In some cases, it may include an appropriate interface for digital video such as ASI and DHEI. The line card may also include multiple on-board video processors for format conversion. While the video processors perform the typical IP routing functions and decide the network loading, these video processors may also change the format and/or bit rate for each video channel and input compressed bitstream dynamically, based on the network loading statistics. In another embodiment, a video processing line card includes a physical interface to twisted pair for xDSL output or a physical interface to coaxial cable for QAM or QPSK output. QAM/QPSK format may be converted into satellite or wireless signal, one-way or two-way.

Although the system shown in FIG. 8 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data streams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention is suitable for use on any transmission channel. One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to subscribers. One particular digital service delivers a compressed digital video signal for video streaming or video on demand.

Another particular communication channel that is becoming increasingly common is IP networks and Asynchronous Transfer Mode (ATM) networks. Both networks are based on different transport protocols which can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. In all these cases, the requested connection must provide the available bandwidth for the data being sent or the requested connection may either have to be rejected or a new set of admissible connection parameters may have to be negotiated.

Advantageously, bit rate information generation and embedding according to the present invention improves transmission of compressed video data, which may result in improved end-user video service. In addition, the present invention may shift the complexity of video transmission via decreased complexity at a network device and potentially increased complexity further upstream at a video broadcast server where bit rate information is generated.

While this invention has been described in terms of several preferred embodiments, there are alterations, permutations, and equivalents which fall within the scope of this invention which have been omitted for brevity's sake. For example, the present invention may be used to perform bandwidth sharing, despite the fact that the available bandwidth from the transmission facility, which includes but is not limited to, xDSL, ATM, wireless channel, is sufficient to send the input compressed bitstream. It is therefore intended that the scope of the invention should be determined with reference to the appended claims.

What is claimed is:

1. A network device for providing a compressed bitstream including video data, the network device comprising:
   an encoder apparatus that receives video data and outputs the compressed bitstream including the video data;
   a processor apparatus that outputs bit rate information describing the bit rate of the video data; and
   a network interface that transmits an output compressed bitstream comprising the compressed bitstream including the video data and transmits the bit rate information.

2. The system of claim 1 wherein the processor apparatus generates and outputs the bit rate information based on the video data before the encoder apparatus receives the video data.

3. The network device of claim 2 further comprising a combiner that combines the bit rate information with the compressed bitstream.

4. The system of claim 3 wherein the combiner embeds the bit rate information in a user data portion of the compressed bitstream including the video data.

5. The system of claim 3 wherein the compressed bitstream is an MPEG-2 compressed bitstream and the combiner embeds the bit rate information in one of the transport stream, the PES layer, and the private data in elementary stream layer of the MPEG-2 bitstream.

6. The network device of claim 1 wherein the bit rate information includes information describing compression of the video data by the encoder apparatus.

7. The network device of claim 6 wherein the bit rate information describes the bit rate profile of a variable bit rate profile compressed bitstream.

8. The network device of claim 1 wherein the encoder apparatus comprises two or more encoder portions.

9. The network device of claim 8 wherein a first encoder portion receives the video data and outputs the compressed bitstream including the video data.

10. The network device of claim 9 wherein a second encoder portion receives second video data and outputs a second compressed bitstream including the second video data.

11. The network device of claim 10 further comprising a multiplexer configured to receive the first compressed bitstream, the second compressed bitstream and the bit rate information, and further configured to output the output compressed bitstream comprising the first video data, the second video data and the bit rate information.

12. The network device of claim 10 wherein the processor apparatus comprises first and second processor portions, the first processor portion responsible for outputting the bit rate information describing the bit rate of the compressed first video data and the second processor portion responsible for outputting the second bit rate information describing the bit rate of the compressed second video data.

13. The network device of claim 1 wherein the bit rate information comprises one of video pre-compression coding information and coding statistics.

14. A method for providing compressed video data, the method comprising:
   encoding video data to provide a compressed bitstream including the compressed video data;
   obtaining bit rate information describing the bit rate of the video data; and
   transmitting an output compressed bitstream comprising the video data and transmitting the bit rate information.

15. The method of claim 14 further including embedding the bit rate information within the compressed video stream to provide the output compressed bitstream.

16. The method of claim 14 further including multiplexing the first compressed bitstream with a second compressed bitstream.

17. The method of claim 14 wherein the bit rate information is obtained in non real-time.

18. The method of claim 17 further including storing the output compressed bitstream comprising the video data and storing the bit rate information.

19. The method of claim 14 wherein the bit rate information includes coding statistics obtained during compression of the video data.

20. The method of claim 14 wherein the bit rate information comprises pre-compression coding information.

21. A network device for transmitting a first compressed bitstream including first video data and a second compressed bitstream including second video data onto a network, the network device comprising:
   an extractor apparatus that obtains bit rate information describing the bit rate of the first video data; and
   a scheduler coupled to the extractor apparatus, the scheduler configured to receive the first compressed bitstream and receive the second compressed bitstream, the scheduler configured to use the bit rate information describing the bit rate of the first video data to schedule the first compressed bitstream and the second compressed bitstream, the scheduler configured to output a compressed bitstream including the first video data and the second video data.

22. The network device of claim 21 wherein the scheduler is included in an open-loop multiplexer.

23. The network device of claim 22 wherein the open-loop multiplexer is a statistical re-multiplexer.

24. The network device of claim 21 wherein the bit rate information is stored in storage location in the first compressed bitstream and the extractor apparatus extracts the bit rate information from the storage location.

25. The network device of claim 24 wherein the bit rate information is stored in a user data portion of the first compressed bitstream.

26. The network device of claim 21 wherein the bit rate information comprises one of video pre-compression coding information and coding statistics.

27. The network device of claim 21 wherein the extractor apparatus comprises a first extractor portion that obtains the bit rate information describing the bit rate of the first video data and a second extractor portion obtains second bit rate information describing the bit rate of the second video data.

28. The network device of claim 21 further including a bit rate converter capable of adapting the bit rate of the first compressed bitstream.

29. The network device of claim 28 further including a bit rate controller that communicates with the bit rate converter to adapt the first compressed bitstream.

30. The network device of claim 21 further including a transmitter coupled to the scheduler and configured to transmit the compressed bitstream including the first video data and the second video data.

31. The network device of claim 21 wherein the network device is configured within a headend.

32. A network device for transmitting a first compressed bitstream including first video data and a second compressed bitstream including second video data onto a network, the network device comprising:
   a processor apparatus that parses the first compressed bitstream and obtains bit rate information describing the bit rate of the first video data; and
   a scheduler coupled to the processor apparatus, the scheduler configured to receive the first compressed bitstream and receive the second compressed bitstream, the scheduler configured to use the bit rate information describing the bit rate of the first video data to schedule the first compressed bitstream and the second compressed bitstream, the scheduler configured to output a compressed bitstream including the first video data and the second video data.

33. The network device of claim 32 wherein the scheduler is included in an open-loop multiplexer.

34. The network device of claim 32 further including a bit rate converter capable of adapting the bit rate of the first compressed bitstream.

35. The network device of claim 34 wherein the multiplexer comprises a bit rate controller that communicates with the bit rate converter to adapt the bit rate of the first compressed bitstream.

36. The network device of claim 32 further including a transmitter coupled to the scheduler and configured to transmit the compressed bitstream including the first video data and the second video data.

37. The network device of claim 32 wherein the bit rate information comprises one of video pre-compression coding information and coding statistics.

38. A method for transmitting first video data and second video data over a transmission channel, the method comprising:
   receiving a first compressed bitstream including the first video data and a second compressed bitstream including the second video data;
   obtaining bit rate information from the first compressed bitstream, the bit rate information describing the bit rate of the first video data;
   scheduling the first compressed bitstream including the first video data and the second compressed bitstream including the second video data using the bit rate information to provide a compressed bitstream comprising the first video data and the second video data; and
   transmitting the compressed bitstream comprising the first video data and the second video data over the transmission channel.

39. The method of claim 38 wherein one of the first compressed bitstream and the second compressed bitstream has a variable bit rate profile.

40. The method of claim 38 wherein the bit rate information is stored in a storage location of the first compressed bitstream and obtaining the bit rate information comprises removing the bit rate information from the storage location.

41. The method of claim 38 further comprising obtaining second bit rate information describing the bit rate of the second video data from the second compressed bitstream.

42. The method of claim 38 wherein obtaining the bit rate information from the first compressed video stream comprises processing a portion of the first compressed bitstream to produce the bit rate information.

43. The method of claim 38 wherein the bit rate information comprises one of video pre-compression coding information and coding statistics at same or different coding conditions.

44. The method of claim 38 further including adapting the bit rate of the compressed bitstream comprising the first video data and the second video data by adapting the bit rate of one of the first compressed bitstream and the second compressed bitstream.

45. A system for providing compressed video data over a transmission channel, the system comprising:
   means for receiving a first compressed bitstream including first video data and a second compressed bitstream including second video data;
   means for obtaining bit rate information from the first compressed bitstream, the bit rate information describing the bit rate of the first video data;
   means for scheduling the first compressed bitstream including the first video data and the second compressed bitstream including the second video data using the bit rate information to provide a compressed bitstream comprising the first video data and the second video data; and
   means for transmitting the compressed bitstream comprising the first video data and the second video data over the transmission channel.

46. A computer readable medium including instructions for providing compressed video data over a transmission channel, the instructions comprising:
   instructions for receiving a first compressed bitstream including first video data and a second compressed bitstream including second video data;
   instructions for obtaining bit rate information from the first compressed bitstream, the bit rate information describing the bit rate of the first video data;
   instructions for scheduling the first compressed bitstream including the first video data and the second compressed bitstream including the second video data using the bit rate information to provide a compressed bitstream comprising the first video data and the second video data; and
   instructions for transmitting the compressed bitstream comprising the first video data and the second video data over the transmission channel.

* * * * *